(12) United States Patent
Crawford

(10) Patent No.: US 9,147,201 B2
(45) Date of Patent: *Sep. 29, 2015

(54) METHOD OF CONDUCTING SOCIAL NETWORK APPLICATION OPERATIONS

(71) Applicant: C. S. Lee Crawford, Irving, TX (US)

(72) Inventor: C. S. Lee Crawford, Irving, TX (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/943,748

(22) Filed: Jul. 16, 2013

(65) Prior Publication Data

US 2014/0108537 A1    Apr. 17, 2014

Related U.S. Application Data

(63) Continuation of application No. 13/586,839, filed on Aug. 15, 2012, now Pat. No. 8,571,999, which is a continuation-in-part of application No. 12/967,040, filed on Dec. 13, 2010, now Pat. No. 8,260,725, which is a continuation-in-part of application No. 12/463,168, filed on May 8, 2009, now abandoned, (Continued)

(51) Int. Cl.
| | |
|---|---|
| *G06Q 99/00* | (2006.01) |
| *G06Q 10/00* | (2012.01) |
| *G06Q 30/00* | (2012.01) |
| *G06F 7/00* | (2006.01) |
| *G06F 17/30* | (2006.01) |
| *G06Q 30/02* | (2012.01) |
| *H04W 4/20* | (2009.01) |
| *G06Q 50/00* | (2012.01) |
| *H04L 29/08* | (2006.01) |

(Continued)

(52) U.S. Cl.
CPC ............ *G06Q 30/0255* (2013.01); *G06Q 30/02* (2013.01); *G06Q 30/0259* (2013.01); *G06Q 30/0267* (2013.01); *G06Q 50/01* (2013.01); *H04L 67/22* (2013.01); *H04L 67/24* (2013.01); *H04L 67/306* (2013.01); *H04W 4/023* (2013.01); *H04W 4/04* (2013.01); *H04W 4/206* (2013.01); *H04W 4/02* (2013.01)

(58) Field of Classification Search
CPC .............. G06Q 50/01; G06Q 30/0261; G06Q 30/0242; G06Q 30/02; G06Q 20/223; G06Q 30/0631; H04L 67/306; H04L 67/104; H04L 51/046; H04W 4/206; H04W 4/02; H04W 4/021; H04W 4/12; A63F 13/46
USPC ........... 705/7.29, 14.53, 14.58, 319; 707/784; 709/228

See application file for complete search history.

(56) References Cited

U.S. PATENT DOCUMENTS

| | | |
|---|---|---|
| 5,671,436 A | 9/1997 | Morris et al. |
| 5,778,316 A | 7/1998 | Persson et al. |

(Continued)

OTHER PUBLICATIONS

King et al. "Privacy: Is There an App for That?" Symposium on Usable Privacy and Security (SOUPS) Jul. 20-22, 2011, Pitsburgh, PA USA.*

(Continued)

*Primary Examiner* — Taelor Kim
*Assistant Examiner* — Berhanu Mitiku

(57) ABSTRACT

In one embodiment, a computer-implemented method comprises: receiving, by a social networking system, location information for a device associated with a first user of the social networking system; associating the location information with the first user in a user profile associated with the first user of the social networking system; sending, from the social networking system, to a second user a communication generated based at least in part on the location information.

20 Claims, 21 Drawing Sheets

Related U.S. Application Data and a continuation-in-part of application No. 12/767,785, filed on Apr. 26, 2010, now abandoned, which is a continuation-in-part of application No. 11/747,286, filed on May 11, 2007, now abandoned, which is a continuation-in-part of application No. 11/623,832, filed on Jan. 17, 2007, now abandoned, which is a continuation-in-part of application No. 11/559,438, filed on Nov. 14, 2006, now abandoned, said application No. 12/463,168 is a continuation of application No. PCT/US2007/083987, filed on Nov. 7, 2007, and a continuation-in-part of application No. 11/623,832, filed on Jan. 17, 2007, now abandoned, and a continuation-in-part of application No. 11/559,438, filed on Nov. 14, 2006, now abandoned.

(60) Provisional application No. 60/736,252, filed on Nov. 14, 2005, provisional application No. 60/759,303, filed on Jan. 17, 2006, provisional application No. 60/773,852, filed on Feb. 16, 2006, provisional application No. 60/864,807, filed on Nov. 8, 2006, provisional application No. 60/917,638, filed on May 11, 2007.

(51) Int. Cl.
*H04W 4/04* (2009.01)
*H04W 4/02* (2009.01)

(56) References Cited

U.S. PATENT DOCUMENTS

| | | |
|---|---|---|
| 5,937,413 A | 8/1999 | Hyun et al. |
| 5,943,611 A | 8/1999 | Molne |
| 5,948,061 A | 9/1999 | Merriman et al. |
| 5,963,940 A | 10/1999 | Liddy et al. |
| 5,973,683 A | 10/1999 | Cragun et al. |
| 5,996,011 A | 11/1999 | Humes |
| 6,006,225 A | 12/1999 | Bowman et al. |
| 6,012,002 A | 1/2000 | Tapping et al. |
| 6,029,139 A | 2/2000 | Cunningham et al. |
| 6,029,141 A | 2/2000 | Bezos et al. |
| 6,045,048 A | 4/2000 | Wilz, Sr. et al. |
| 6,061,658 A | 5/2000 | Chou et al. |
| 6,078,314 A | 6/2000 | Ahn |
| 6,092,100 A | 7/2000 | Berstis et al. |
| 6,097,939 A | 8/2000 | Jacobs |
| 6,135,349 A | 10/2000 | Zirkel |
| 6,141,341 A | 10/2000 | Jones et al. |
| 6,178,407 B1 | 1/2001 | Lotvin et al. |
| 6,182,050 B1 | 1/2001 | Ballard |
| 6,199,099 B1 | 3/2001 | Gershman et al. |
| 6,216,129 B1 | 4/2001 | Eldering |
| 6,226,510 B1 | 5/2001 | Boling et al. |
| 6,246,997 B1 | 6/2001 | Cybul et al. |
| 6,247,047 B1 | 6/2001 | Wolff |
| 6,253,188 B1 | 6/2001 | Witek et al. |
| 6,269,361 B1 | 7/2001 | Davis et al. |
| 6,285,987 B1 | 9/2001 | Roth et al. |
| 6,327,470 B1 | 12/2001 | Ostling |
| 6,336,117 B1 | 1/2002 | Massarani |
| 6,339,761 B1 | 1/2002 | Cottingham |
| 6,356,905 B1 | 3/2002 | Gershman et al. |
| 6,374,177 B1 | 4/2002 | Lee et al. |
| 6,389,538 B1 | 5/2002 | Gruse et al. |
| 6,434,532 B2 | 8/2002 | Goldband et al. |
| 6,446,076 B1 | 9/2002 | Burkey et al. |
| 6,480,837 B1 | 11/2002 | Dutta |
| 6,487,538 B1 | 11/2002 | Gupta et al. |
| 6,512,919 B2 | 1/2003 | Ogasawara |
| 6,516,416 B2 | 2/2003 | Gregg et al. |
| 6,519,585 B1 | 2/2003 | Kohli |
| 6,526,275 B1 | 2/2003 | Calvert |
| 6,556,997 B1 | 4/2003 | Levy |
| 6,559,828 B1 | 5/2003 | Impio |
| 6,560,651 B2 | 5/2003 | Mott et al. |
| 6,564,327 B1 | 5/2003 | Klensin et al. |
| 6,573,883 B1 | 6/2003 | Bartlett |
| 6,577,861 B2 | 6/2003 | Ogasawara |
| 6,615,172 B1 | 9/2003 | Bennett et al. |
| 6,625,732 B1 | 9/2003 | Weirauch et al. |
| 6,631,372 B1 | 10/2003 | Graham |
| 6,647,269 B2 | 11/2003 | Hendrey et al. |
| 6,651,053 B1 | 11/2003 | Rothschild |
| 6,664,922 B1 | 12/2003 | Fan |
| 6,665,837 B1 | 12/2003 | Dean et al. |
| 6,701,317 B1 | 3/2004 | Wiener et al. |
| 6,704,727 B1 | 3/2004 | Kravets |
| 6,704,787 B1 | 3/2004 | Umbreit |
| 6,718,324 B2 | 4/2004 | Edlund et al. |
| 6,718,365 B1 | 4/2004 | Dutta |
| 6,728,731 B2 | 4/2004 | Sarukkai et al. |
| 6,742,047 B1 | 5/2004 | Tso |
| 6,772,340 B1 | 8/2004 | Peinado et al. |
| 6,775,537 B1 | 8/2004 | Panichkul et al. |
| 6,775,831 B1 | 8/2004 | Carrasco et al. |
| 6,778,834 B2 | 8/2004 | Laitinen et al. |
| 6,778,975 B1 | 8/2004 | Anick et al. |
| 6,799,298 B2 | 9/2004 | deVries et al. |
| 6,813,489 B1 | 11/2004 | Wu et al. |
| 6,813,501 B2 | 11/2004 | Kinnunen et al. |
| 6,826,572 B2 | 11/2004 | Colace et al. |
| 6,829,475 B1 | 12/2004 | Lee et al. |
| 6,832,259 B2 | 12/2004 | Hymel et al. |
| 6,834,195 B2 | 12/2004 | Brandenberg et al. |
| 6,842,767 B1 | 1/2005 | Partovi et al. |
| 6,853,982 B2 | 2/2005 | Smith et al. |
| 6,871,202 B2 | 3/2005 | Broder |
| 6,876,997 B1 | 4/2005 | Rorex et al. |
| 6,892,206 B2 | 5/2005 | Dharap |
| 6,896,188 B1 | 5/2005 | Graham |
| 6,904,408 B1 | 6/2005 | McCarthy et al. |
| 6,907,566 B1 | 6/2005 | McElfresh et al. |
| 6,920,448 B2 | 7/2005 | Kincaid et al. |
| 6,937,998 B1 | 8/2005 | Swartz et al. |
| 6,941,376 B2 | 9/2005 | Mitchell et al. |
| 6,944,447 B2 | 9/2005 | Portman et al. |
| 6,947,930 B2 | 9/2005 | Anick et al. |
| 6,950,994 B2 | 9/2005 | Dharap |
| 6,954,641 B2 | 10/2005 | McKenna et al. |
| 6,963,867 B2 | 11/2005 | Ford et al. |
| 6,968,178 B2 | 11/2005 | Pradhan et al. |
| 6,968,179 B1 * | 11/2005 | De Vries .................... 455/414.1 |
| 6,968,333 B2 | 11/2005 | Abbott et al. |
| 6,978,263 B2 | 12/2005 | Soulanille |
| 6,978,264 B2 | 12/2005 | Chandrasekar et al. |
| 6,983,272 B2 | 1/2006 | Davis et al. |
| 6,983,280 B2 | 1/2006 | Cheung et al. |
| 6,993,494 B1 | 1/2006 | Boushy et al. |
| 7,007,239 B1 | 2/2006 | Hawkins et al. |
| 7,013,292 B1 | 3/2006 | Hsu et al. |
| 7,020,654 B1 | 3/2006 | Najmi |
| 7,027,987 B1 | 4/2006 | Franz et al. |
| 7,035,811 B2 | 4/2006 | Gorenstein |
| 7,047,033 B2 | 5/2006 | Wyler |
| 7,062,258 B1 | 6/2006 | Sini et al. |
| 7,062,453 B1 | 6/2006 | Clarke |
| 7,071,842 B1 | 7/2006 | Brady, Jr. |
| 7,089,036 B2 | 8/2006 | Prise |
| 7,120,235 B2 | 10/2006 | Altberg et al. |
| 7,130,923 B2 | 10/2006 | Mason |
| 7,145,457 B2 | 12/2006 | Spitz et al. |
| 7,159,194 B2 | 1/2007 | Wong et al. |
| 7,162,493 B2 | 1/2007 | Weiss et al. |
| 7,184,020 B2 | 2/2007 | Matsui |
| 7,185,088 B1 | 2/2007 | Joy et al. |
| 7,188,307 B2 | 3/2007 | Ohsawa |
| 7,191,177 B2 | 3/2007 | Konaka |
| 7,219,309 B2 | 5/2007 | Kaasila et al. |
| 7,249,123 B2 | 7/2007 | Elder et al. |
| 7,269,590 B2 | 9/2007 | Hull et al. |
| 7,277,718 B2 | 10/2007 | Wong |

(56) References Cited

U.S. PATENT DOCUMENTS

| | | |
|---|---|---|
| 7,281,042 B2 | 10/2007 | Hsu et al. |
| 7,289,623 B2 | 10/2007 | Lurie |
| 7,308,261 B2 | 12/2007 | Henderson et al. |
| 7,330,890 B1 | 2/2008 | Partovi et al. |
| 7,376,714 B1 | 5/2008 | Gerken |
| 7,437,364 B1 | 10/2008 | Fredricksen et al. |
| 7,461,528 B2 | 12/2008 | Taniguchi et al. |
| 7,480,867 B1 | 1/2009 | Racine et al. |
| 7,487,112 B2 | 2/2009 | Barnes, Jr. |
| 7,669,123 B2 | 2/2010 | Zuckerberg et al. |
| 7,769,764 B2 | 8/2010 | Ramer et al. |
| 2001/0030234 A1 | 10/2001 | Wiklof |
| 2001/0037174 A1 | 11/2001 | Dickerson |
| 2001/0037721 A1 | 11/2001 | Hasegawa et al. |
| 2001/0041561 A1 | 11/2001 | Ventulett et al. |
| 2001/0044758 A1 | 11/2001 | Talib et al. |
| 2001/0049636 A1 | 12/2001 | Hudda et al. |
| 2001/0049677 A1 | 12/2001 | Talib et al. |
| 2001/0051911 A1 | 12/2001 | Marks et al. |
| 2001/0054001 A1 | 12/2001 | Robinson |
| 2001/0054066 A1 | 12/2001 | Spitzer |
| 2002/0013727 A1 | 1/2002 | Lee |
| 2002/0029186 A1 | 3/2002 | Roth et al. |
| 2002/0029267 A1 | 3/2002 | Sankuratripati et al. |
| 2002/0046104 A1 | 4/2002 | Kaddeche et al. |
| 2002/0049679 A1 | 4/2002 | Russell et al. |
| 2002/0051521 A1 | 5/2002 | Patrick |
| 2002/0052674 A1 | 5/2002 | Chang et al. |
| 2002/0052781 A1 | 5/2002 | Aufricht et al. |
| 2002/0053076 A1 | 5/2002 | Landesmann |
| 2002/0059201 A1 | 5/2002 | Work |
| 2002/0062310 A1 | 5/2002 | Marmor et al. |
| 2002/0063735 A1 | 5/2002 | Tamir et al. |
| 2002/0065713 A1 | 5/2002 | Awada et al. |
| 2002/0073420 A1 | 6/2002 | Yoon |
| 2002/0077897 A1 | 6/2002 | Zellner et al. |
| 2002/0077908 A1 | 6/2002 | Sakuma et al. |
| 2002/0078045 A1 | 6/2002 | Dutta |
| 2002/0078209 A1 | 6/2002 | Peng |
| 2002/0082049 A1 | 6/2002 | Prise |
| 2002/0087408 A1 | 7/2002 | Burnett |
| 2002/0123928 A1 | 9/2002 | Eldering et al. |
| 2002/0143860 A1 | 10/2002 | Catan |
| 2002/0156677 A1 | 10/2002 | Peters et al. |
| 2002/0165773 A1 | 11/2002 | Natsuno et al. |
| 2002/0169654 A1 | 11/2002 | Santos et al. |
| 2002/0171691 A1 | 11/2002 | Currans et al. |
| 2002/0198791 A1 | 12/2002 | Perkowski |
| 2003/0003929 A1 | 1/2003 | Himmel et al. |
| 2003/0004831 A1 | 1/2003 | Owens |
| 2003/0006911 A1 | 1/2003 | Smith et al. |
| 2003/0014659 A1 | 1/2003 | Zhu |
| 2003/0020749 A1 | 1/2003 | Abu-Hakima et al. |
| 2003/0028889 A1 | 2/2003 | McCoskey et al. |
| 2003/0045273 A1 | 3/2003 | Pyhalammi et al. |
| 2003/0050863 A1 | 3/2003 | Radwin |
| 2003/0055831 A1 | 3/2003 | Ryan et al. |
| 2003/0058842 A1 | 3/2003 | Bud |
| 2003/0060198 A1 | 3/2003 | Li |
| 2003/0063072 A1 | 4/2003 | Brandenberg et al. |
| 2003/0065805 A1 | 4/2003 | Barnes |
| 2003/0078882 A1 | 4/2003 | Sukeda et al. |
| 2003/0079222 A1 | 4/2003 | Boykin et al. |
| 2003/0084098 A1 | 5/2003 | Lavin et al. |
| 2003/0093311 A1 | 5/2003 | Knowlson |
| 2003/0093314 A1 | 5/2003 | Leung et al. |
| 2003/0100320 A1 | 5/2003 | Ranjan |
| 2003/0115318 A1 | 6/2003 | Wueste |
| 2003/0126095 A1 | 7/2003 | Allen |
| 2003/0130887 A1 | 7/2003 | Nathaniel |
| 2003/0132298 A1 | 7/2003 | Swartz et al. |
| 2003/0135581 A1 | 7/2003 | Phelan et al. |
| 2003/0135582 A1 | 7/2003 | Allen et al. |
| 2003/0135825 A1 | 7/2003 | Gertner et al. |
| 2003/0140004 A1 | 7/2003 | O'Leary et al. |
| 2003/0145093 A1 | 7/2003 | Oren et al. |
| 2003/0146932 A1 | 8/2003 | Weng et al. |
| 2003/0149793 A1 | 8/2003 | Bannoura et al. |
| 2003/0149937 A1 | 8/2003 | McElfresh et al. |
| 2003/0149938 A1 | 8/2003 | McElfresh et al. |
| 2003/0158776 A1 | 8/2003 | Landesmann |
| 2003/0163833 A1 | 8/2003 | Chiba et al. |
| 2003/0172145 A1 | 9/2003 | Nguyen |
| 2003/0187878 A1 | 10/2003 | Sandifer |
| 2003/0187996 A1 | 10/2003 | Cardina et al. |
| 2003/0195009 A1 | 10/2003 | Endo |
| 2003/0204447 A1 | 10/2003 | Dalzell et al. |
| 2003/0222918 A1 | 12/2003 | Coulthard |
| 2003/0225632 A1 | 12/2003 | Tong et al. |
| 2003/0226866 A1 | 12/2003 | Har-Shen |
| 2004/0019478 A1 | 1/2004 | Rucker et al. |
| 2004/0023644 A1 | 2/2004 | Montemer |
| 2004/0024752 A1 | 2/2004 | Manber et al. |
| 2004/0024846 A1 | 2/2004 | Randall et al. |
| 2004/0044571 A1 | 3/2004 | Bronnimann et al. |
| 2004/0054569 A1 | 3/2004 | Pombo et al. |
| 2004/0059708 A1 | 3/2004 | Dean et al. |
| 2004/0068552 A1 | 4/2004 | Kotz et al. |
| 2004/0073574 A1 | 4/2004 | Shimizu et al. |
| 2004/0088177 A1 | 5/2004 | Travis et al. |
| 2004/0122735 A1 | 6/2004 | Meshkin |
| 2004/0148275 A1 | 7/2004 | Achlioptas |
| 2004/0158630 A1 | 8/2004 | Chang et al. |
| 2004/0193698 A1 | 9/2004 | Lakshminarayana |
| 2004/0199422 A1 | 10/2004 | Napier et al. |
| 2004/0199575 A1 | 10/2004 | Geller |
| 2004/0203630 A1 | 10/2004 | Wang |
| 2004/0203854 A1 | 10/2004 | Nowak |
| 2004/0218562 A1 | 11/2004 | Orava et al. |
| 2004/0220926 A1 | 11/2004 | Lamkin et al. |
| 2004/0225647 A1 | 11/2004 | Connelly et al. |
| 2004/0230461 A1 | 11/2004 | Talib et al. |
| 2004/0230503 A1 | 11/2004 | Lucas |
| 2004/0230574 A1 | 11/2004 | Kravets |
| 2004/0243569 A1 | 12/2004 | Burrows |
| 2004/0249768 A1 | 12/2004 | Kontio et al. |
| 2004/0260689 A1 | 12/2004 | Colace et al. |
| 2005/0021110 A1 | 1/2005 | Maschke et al. |
| 2005/0021750 A1 | 1/2005 | Abrams |
| 2005/0027666 A1 | 2/2005 | Beck et al. |
| 2005/0041647 A1 | 2/2005 | Stinnie |
| 2005/0064852 A1 | 3/2005 | Baldursson |
| 2005/0065917 A1 | 3/2005 | Anick et al. |
| 2005/0065995 A1 | 3/2005 | Milstein et al. |
| 2005/0068169 A1 | 3/2005 | Copley et al. |
| 2005/0071325 A1 | 3/2005 | Bem |
| 2005/0071741 A1 | 3/2005 | Acharya et al. |
| 2005/0075932 A1 | 4/2005 | Mankoff |
| 2005/0076014 A1 | 4/2005 | Agarwal et al. |
| 2005/0086112 A1 | 4/2005 | Shkedi |
| 2005/0097204 A1 | 5/2005 | Horowitz et al. |
| 2005/0102381 A1 | 5/2005 | Jiang et al. |
| 2005/0114312 A1 | 5/2005 | Mosescu |
| 2005/0114759 A1 | 5/2005 | Williams et al. |
| 2005/0119936 A1 | 6/2005 | Buchanan et al. |
| 2005/0125723 A1 | 6/2005 | Griswold et al. |
| 2005/0131762 A1 | 6/2005 | Bharat et al. |
| 2005/0144065 A1 | 6/2005 | Calabria et al. |
| 2005/0144073 A1 | 6/2005 | Morrisroe et al. |
| 2005/0144297 A1 | 6/2005 | Dahlstrom et al. |
| 2005/0149399 A1 | 7/2005 | Fukunaga et al. |
| 2005/0154639 A1 | 7/2005 | Zetmeir |
| 2005/0154716 A1 | 7/2005 | Watson et al. |
| 2005/0154717 A1 | 7/2005 | Watson et al. |
| 2005/0159164 A1 | 7/2005 | Leedom, Jr. |
| 2005/0159970 A1 | 7/2005 | Buyukkokten et al. |
| 2005/0165666 A1 | 7/2005 | Wong et al. |
| 2005/0171799 A1 | 8/2005 | Hull et al. |
| 2005/0171863 A1 | 8/2005 | Hagen |
| 2005/0171936 A1 | 8/2005 | Zhu |
| 2005/0171955 A1 | 8/2005 | Hull et al. |
| 2005/0177385 A1 | 8/2005 | Hull et al. |
| 2005/0177593 A1 | 8/2005 | Solomon |
| 2005/0177614 A1 | 8/2005 | Bourne |

(56) References Cited

U.S. PATENT DOCUMENTS

| | | |
|---|---|---|
| 2005/0185060 A1 | 8/2005 | Neven, Sr. |
| 2005/0187971 A1 | 8/2005 | Hassan et al. |
| 2005/0190747 A1 | 9/2005 | Sindhwani et al. |
| 2005/0191936 A1 | 9/2005 | Marine et al. |
| 2005/0197846 A1 | 9/2005 | Pezaris et al. |
| 2005/0198020 A1 | 9/2005 | Garland et al. |
| 2005/0198031 A1 | 9/2005 | Pezaris et al. |
| 2005/0198095 A1 | 9/2005 | Du et al. |
| 2005/0198305 A1 | 9/2005 | Pezaris et al. |
| 2005/0203807 A1 | 9/2005 | Bezos et al. |
| 2005/0203888 A1 | 9/2005 | Woosley et al. |
| 2005/0216300 A1 | 9/2005 | Appelman et al. |
| 2005/0216550 A1 | 9/2005 | Paseman et al. |
| 2005/0221843 A1 | 10/2005 | Friedman et al. |
| 2005/0222989 A1 | 10/2005 | Haveliwala et al. |
| 2005/0223000 A1 | 10/2005 | Davis et al. |
| 2005/0227676 A1 | 10/2005 | De Vries |
| 2005/0233742 A1 | 10/2005 | Karaoguz et al. |
| 2005/0234768 A1 | 10/2005 | Wald et al. |
| 2005/0234891 A1 | 10/2005 | Walther et al. |
| 2005/0234929 A1 | 10/2005 | Ionescu et al. |
| 2005/0235062 A1 | 10/2005 | Lunt et al. |
| 2005/0240472 A1 | 10/2005 | Postrel |
| 2005/0240477 A1 | 10/2005 | Friday et al. |
| 2005/0240557 A1 | 10/2005 | Rorex et al. |
| 2005/0246132 A1 | 11/2005 | Olin et al. |
| 2005/0256756 A1 | 11/2005 | Lam et al. |
| 2005/0266889 A1 | 12/2005 | Kuhl et al. |
| 2005/0289113 A1 | 12/2005 | Bookstaff |
| 2005/0289468 A1 | 12/2005 | Kahn et al. |
| 2006/0004594 A1 | 1/2006 | Doliov |
| 2006/0004627 A1 | 1/2006 | Baluja |
| 2006/0004739 A1 | 1/2006 | Anthony et al. |
| 2006/0004850 A1 | 1/2006 | Chowdhury |
| 2006/0010699 A1 | 1/2006 | Tamura |
| 2006/0015201 A1 | 1/2006 | Lapstun et al. |
| 2006/0019716 A1 | 1/2006 | Pell et al. |
| 2006/0036565 A1 | 2/2006 | Bruecken |
| 2006/0041543 A1 | 2/2006 | Achlioptas |
| 2006/0041556 A1 | 2/2006 | Taniguchi et al. |
| 2006/0042483 A1 | 3/2006 | Work et al. |
| 2006/0048059 A1 | 3/2006 | Etkin |
| 2006/0052091 A1 | 3/2006 | Onyon et al. |
| 2006/0059129 A1 | 3/2006 | Azuma et al. |
| 2006/0073810 A1 | 4/2006 | Pyhalammi et al. |
| 2006/0074883 A1 | 4/2006 | Teevan et al. |
| 2006/0075335 A1 | 4/2006 | Gloor |
| 2006/0080613 A1 | 4/2006 | Savant |
| 2006/0085419 A1 | 4/2006 | Rosen |
| 2006/0085750 A1 | 4/2006 | Easton, Jr. et al. |
| 2006/0100998 A1 | 5/2006 | Edwards et al. |
| 2006/0106674 A1 | 5/2006 | Muller |
| 2006/0106710 A1 | 5/2006 | Meek et al. |
| 2006/0112179 A1 | 5/2006 | Baumeister et al. |
| 2006/0122879 A1 | 6/2006 | O'Kelley |
| 2006/0123014 A1 | 6/2006 | Ng |
| 2006/0123053 A1 | 6/2006 | Scannell, Jr. |
| 2006/0129541 A1 | 6/2006 | Morgan et al. |
| 2006/0136419 A1 | 6/2006 | Brydon et al. |
| 2006/0143183 A1 | 6/2006 | Goldberg et al. |
| 2006/0155597 A1 | 7/2006 | Gleason |
| 2006/0155706 A1 | 7/2006 | Kalinichenko et al. |
| 2006/0161599 A1 | 7/2006 | Rosen |
| 2006/0161778 A1 | 7/2006 | Stirbu et al. |
| 2006/0167747 A1 | 7/2006 | Goodman et al. |
| 2006/0178986 A1 | 8/2006 | Giordano et al. |
| 2006/0184417 A1 | 8/2006 | Van der Linden et al. |
| 2006/0184617 A1 | 8/2006 | Nicholas et al. |
| 2006/0190281 A1 | 8/2006 | Kott et al. |
| 2006/0190328 A1 | 8/2006 | Singh et al. |
| 2006/0194186 A1 | 8/2006 | Nanda |
| 2006/0212451 A1 | 9/2006 | Serdy, Jr. et al. |
| 2006/0217110 A1 | 9/2006 | Othmer |
| 2006/0218225 A1 | 9/2006 | Hee Voon et al. |
| 2006/0224447 A1 | 10/2006 | Koningstein |
| 2006/0229063 A1 | 10/2006 | Koch |
| 2006/0230061 A1 | 10/2006 | Sample et al. |
| 2006/0236257 A1 | 10/2006 | Othmer et al. |
| 2006/0236258 A1 | 10/2006 | Othmer et al. |
| 2006/0242007 A1 | 10/2006 | Leong et al. |
| 2006/0242017 A1 | 10/2006 | Libes et al. |
| 2006/0242129 A1 | 10/2006 | Libes et al. |
| 2006/0247940 A1 | 11/2006 | Zhu et al. |
| 2006/0248573 A1 | 11/2006 | Pannu et al. |
| 2006/0253427 A1 | 11/2006 | Wu et al. |
| 2006/0256008 A1 | 11/2006 | Rosenberg |
| 2006/0256130 A1 | 11/2006 | Gonzalez |
| 2006/0259365 A1 | 11/2006 | Agarwal et al. |
| 2006/0259434 A1 | 11/2006 | Vilcauskas, Jr. et al. |
| 2006/0259479 A1 | 11/2006 | Dai |
| 2006/0265227 A1 | 11/2006 | Sadamura et al. |
| 2006/0271425 A1 | 11/2006 | Goodman et al. |
| 2006/0271438 A1 | 11/2006 | Shotland et al. |
| 2006/0287919 A1 | 12/2006 | Rubens et al. |
| 2006/0287936 A1 | 12/2006 | Jacobson |
| 2006/0288015 A1 | 12/2006 | Schirripa et al. |
| 2006/0293065 A1 | 12/2006 | Chew et al. |
| 2006/0293976 A1 | 12/2006 | Nam |
| 2006/0294025 A1 | 12/2006 | Mengerink |
| 2006/0294094 A1 | 12/2006 | King et al. |
| 2007/0005570 A1 | 1/2007 | Hurst-Hiller et al. |
| 2007/0005584 A1 | 1/2007 | Feng et al. |
| 2007/0005587 A1 | 1/2007 | Johnson et al. |
| 2007/0011078 A1 | 1/2007 | Jain et al. |
| 2007/0016473 A1 | 1/2007 | Anderson et al. |
| 2007/0027744 A1 | 2/2007 | Carson et al. |
| 2007/0027751 A1 | 2/2007 | Carson et al. |
| 2007/0027839 A1 | 2/2007 | Ives |
| 2007/0027857 A1 | 2/2007 | Deng et al. |
| 2007/0032240 A1 | 2/2007 | Finnegan et al. |
| 2007/0033210 A1 | 2/2007 | Baudino et al. |
| 2007/0060173 A1 | 3/2007 | Ramer et al. |
| 2007/0061146 A1 | 3/2007 | Jaramillo et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |
| 2007/0061229 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0067267 A1 | 3/2007 | Ives |
| 2007/0067824 A1 | 3/2007 | Silverbrook et al. |
| 2007/0073656 A1 | 3/2007 | Bandi |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0078832 A1 | 4/2007 | Ott et al. |
| 2007/0078851 A1 | 4/2007 | Grell et al. |
| 2007/0083611 A1 | 4/2007 | Farago et al. |
| 2007/0094042 A1 | 4/2007 | Ramer et al. |
| 2007/0100650 A1 | 5/2007 | Ramer et al. |
| 2007/0100651 A1 | 5/2007 | Ramer et al. |
| 2007/0100652 A1 | 5/2007 | Ramer et al. |
| 2007/0100653 A1 | 5/2007 | Ramer et al. |
| 2007/0100805 A1 | 5/2007 | Ramer et al. |
| 2007/0100806 A1 | 5/2007 | Ramer et al. |
| 2007/0106564 A1 | 5/2007 | Matotek et al. |

(56) References Cited

U.S. PATENT DOCUMENTS

| | | |
|---|---|---|
| 2007/0112645 A1 | 5/2007 | Traynor et al. |
| 2007/0112739 A1 | 5/2007 | Burns et al. |
| 2007/0118533 A1 | 5/2007 | Ramer et al. |
| 2007/0118739 A1 | 5/2007 | Togashi et al. |
| 2007/0135084 A1 | 6/2007 | Ido et al. |
| 2007/0136261 A1 | 6/2007 | Taboada et al. |
| 2007/0168354 A1 | 7/2007 | Ramer et al. |
| 2007/0174117 A1 | 7/2007 | Hendrickson et al. |
| 2007/0174389 A1 | 7/2007 | Armstrong et al. |
| 2007/0179792 A1 | 8/2007 | Kramer |
| 2007/0185768 A1 | 8/2007 | Vengroff et al. |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0202900 A1 | 8/2007 | Inselberg |
| 2007/0203887 A1 | 8/2007 | Dynin |
| 2007/0208916 A1 | 9/2007 | Tomita |
| 2007/0233730 A1 | 10/2007 | Johnston |
| 2007/0239724 A1 | 10/2007 | Ramer et al. |
| 2007/0244900 A1 | 10/2007 | Hopkins et al. |
| 2007/0260635 A1 | 11/2007 | Ramer et al. |
| 2007/0274506 A1 | 11/2007 | Schundler |
| 2007/0276829 A1 | 11/2007 | Wang et al. |
| 2007/0282987 A1 | 12/2007 | Fischer et al. |
| 2007/0288427 A1 | 12/2007 | Ramer et al. |
| 2008/0005076 A1 | 1/2008 | Payne et al. |
| 2008/0009268 A1 | 1/2008 | Ramer et al. |
| 2008/0010343 A1 | 1/2008 | Escaffi et al. |
| 2008/0033776 A1 | 2/2008 | Marchese |
| 2008/0040428 A1 | 2/2008 | Wei et al. |
| 2008/0040475 A1 | 2/2008 | Bosworth et al. |
| 2008/0070697 A1 | 3/2008 | Robinson et al. |
| 2008/0086458 A1 | 4/2008 | Robinson et al. |
| 2008/0126411 A1 | 5/2008 | Zhuang et al. |
| 2008/0133495 A1 | 6/2008 | Fischer et al. |
| 2008/0133649 A1 | 6/2008 | Pennington et al. |
| 2008/0134035 A1 | 6/2008 | Pennington et al. |
| 2008/0195483 A1 | 8/2008 | Moore |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215428 A1 | 9/2008 | Ramer et al. |
| 2008/0215429 A1 | 9/2008 | Ramer et al. |
| 2008/0215475 A1 | 9/2008 | Ramer et al. |
| 2008/0215623 A1 | 9/2008 | Ramer et al. |
| 2008/0231642 A1 | 9/2008 | Okita et al. |
| 2008/0242279 A1 | 10/2008 | Ramer et al. |
| 2008/0270220 A1 | 10/2008 | Ramer et al. |
| 2008/0288612 A1 | 11/2008 | Kwon et al. |
| 2009/0005040 A1 | 1/2009 | Bourne et al. |
| 2009/0029687 A1 | 1/2009 | Ramer et al. |
| 2009/0030952 A1 | 1/2009 | Donahue et al. |
| 2009/0070219 A1 | 3/2009 | D'Angelo et al. |
| 2009/0222329 A1 | 9/2009 | Ramer et al. |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2010/0257023 A1 | 10/2010 | Kendall et al. |
| 2013/0073473 A1* | 3/2013 | Heath .................. 705/319 |
| 2013/0339345 A1* | 12/2013 | Soto Matamala et al. .... 707/722 |

OTHER PUBLICATIONS

Do et al. "Smartphone Usage in the Wild: a Large-Scale Analysis of Applications and Context" ICMI'11, Nov. 14-18, 2011 Alicante, Spain.*

Macias et al. "Mobile Sensing Systems" Grupo de Arquitectura y Concurrencia (GAC), Departamento de Ingeniería Telemática, Universidad de Las Palmas de Gran Canaria, Campus Universitario de Tafira, Sensors 2013, 13, 17292-17321.*

Nunes et al. "A Web Service-Based Framework Model for People-Centric Sensing Applications Applied to Social Networking" Department of Informatics Engineering, University of Coimbra, Pólo II, Pinhal de Marrocos, Coimbra 3030-290, Portugal; E-Mails: than@dei.uc.pt (T.-D.T.); Sensors 2012, 12.*

Sarigo et al. "Enabling social networking in ad hoc networks of mobile phones" ACM. VLDB '09, August 2428, 2009, Lyon, France.*

* cited by examiner

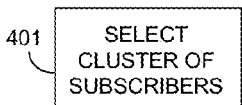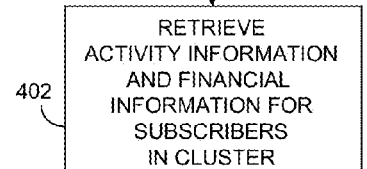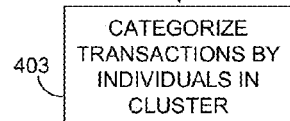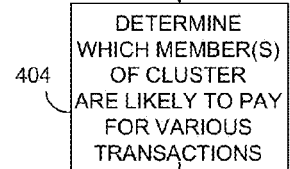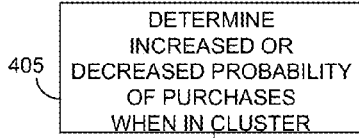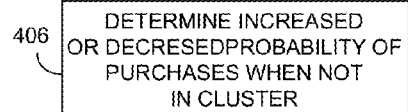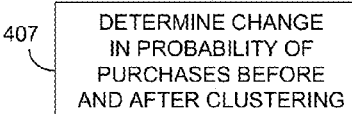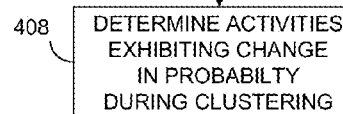
*FIGURE 4*
*FIGURE 5*
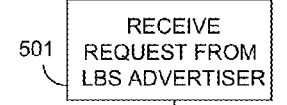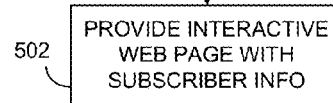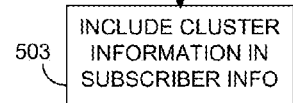
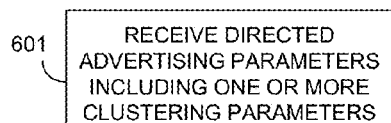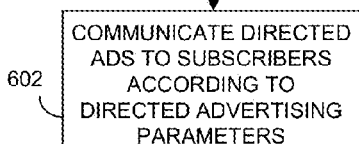
*FIGURE 6*
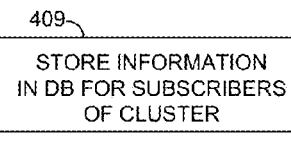

FIGURE 7

SUBSCRIBER # 123456789

ACTIVITY PROFILE

|  | AVG. TIME PER DAY (STD. DEVIATION) | | | | | | | AVG. PER WEEK (STD. DEVIATION) | AVG. PER MONTH (STD. DEVIATION) |
|---|---|---|---|---|---|---|---|---|---|
|  | S | M | T | W | T | F | S | | |
| ACTIVITY #1 | V1(s1) | V2(s2) | V3(s3) | V4(s4) | V5(s5) | V6(s6) | V7(s7) | V8(s8) | V9(s9) |
| SUBACTIVITY | V'1(s'1) | V'2(s'2) | V'3(s'3) | V'4(s'4) | V'5(s'5) | V'6(s'6) | V'7(s'7) | V'8(s'8) | V'9(s'9) |
| SUBACTIVITY | V'''1(s'''1) | V'''2(s'''2) | V'''3(s'''3) | V'''4(s'''4) | V'''5(s'''5) | V'''6(s'''6) | V'''7(s'''7) | V'''8(s'''8) | V'''9(s'''9) |
| ... | | | | | | | | | |
| ACTIVITY #N | N1(M1) | N2(M2) | N3(M3) | N4(M4) | N5(M5) | N6(M6) | N7(M7) | N8(8) | N9(M9) |
| SUBACTIVITY | N'1(M'1) | N'2(M'2) | N'3(M'3) | N'4(M'4) | N'5(M'5) | N'6(M'6) | N'7(M'7) | N'8(M'8) | N'9(M'9) |
| SUBACTIVITY | N'''1(M'''1) | N'''2(M'''2) | N'''3(M'''3) | N'''4(M'''4) | N'''5(M'''5) | N'''6(M'''6) | N'''7(M'''7) | N'''8(M'''8) | N'''9(M'''9) |

SUBSCRIBER # 123456789

|  | S | M | T | W | T | F | S | PER WEEK | PER MONTH |
|---|---|---|---|---|---|---|---|---|---|
| TOTAL TIME SPENT SHOPPING | X1(x1) | X2(x2) | X3(x3) | X4(x4) | X5(x5) | X6(x6) | X7(x7) | X8(x8) | X9(x9) |
| SHOPPING FREQUENCY | F1(f1) | F2(f2) | F3(f3) | F4(f4) | F5(f5) | F6(f6) | F7(f7) | F8(f8) | F9(f9) |

TIME PER SHOPPING TRIP

|  | S | M | T | W | T | F | S | PER WEEK | PER MONTH |
|---|---|---|---|---|---|---|---|---|---|
| TOTAL | T1(t1) | T2(t2) | T3(t3) | T4(t4) | T5(t5) | T6(t6) | T7(t7) | T8(t8) | T9(t9) |

TIME SPENT SHOPPING BY LOCATION

LOCATION 1:
TIME AT LOCATION: L1(l1) L2(l2) L3(l3) L4(l4) L5(l5) L6(l6) L7(l7) L8(l8) L9(l9)
OF STORES AT LOCATION: SL1(sl1) SL2(sl2) SL3(sl3) SL4(sl4) SL5(sl5) SL6(sl6) SL7(sl7) SL8(sl8) SL9(sl9)

. . .

LOCATION #Z:
TIME AT LOCATION: LZ(lz1) LZ2(lz2) LZ3(lz3) LZ4(lz4) LZ5(lz5) LZ6(lz6) LZ7(lz7) LZ8(lz8) LZ9(z9)
OF STORES AT LOCATION: SLZ(slz1) SLZ2(slz2) SLZ3(slz3) SLZ4(slz4) SLZ5(slz5) SLZ6(slz6) SLZ7(slz7) SLZ8(slz8) SLZ9(slz9)

*FIGURE 11*

SUBSCRIBER # 123456789

TIME SPENT SHOPPING
BY MERCHANTS

|  | S | M | T | W | T | F | S | PER WEEK | PER MONTH |
|---|---|---|---|---|---|---|---|---|---|
| MERCHANT 1: |  | TM1-1 | TM1-2 | TM1-3 | TM1-4 | TM1-5 | TM1-6 | TM1-7 | TM1-8 | TM1-9 |
|  |  | sTM1-1 | sTM1-2 | sTM1-3 | sTM1-4 | sTM1-5 | sTM1-6 | sTM1-7 | sTM1-8 | sTM1-9 |
| SUB-STORE DEPT./TYPE 1 | TM1-S1-1 | TM1-S1-2 | TM1-S1-3 | TM1-S1-4 | TM1-S1-5 | TM1-S1-6 | TM1-S1-7 | TM1-S1-8 | TM1-S1-9 |
|  | sTM1-S1-1 | sTM1-S1-2 | sTM1-S1-3 | sTM1-S1-4 | sTM1-S1-5 | sTM1-S1-6 | sTM1-S1-7 | sTM1-S1-8 | sTM1-S1-9 |

...

SUB-STORE DEPT./TYPE Y)
TM1-SY-1 TM1-SY-2 TM1-SY-3 TM1-SY-4 TM1-SY-5 TMY-SY-6 TM1-SY-7 TM1-SY-8 TM1-SY-9
sTM1-SY-1 sTM1-SY-2 sTM1-SY-3 sTM1-SY-4 sTM1-SY-5 sTMY-SY-6 sTM1-SY-7 sTM1-SY-8 sTM1-SY-9

...

MERCHANT X: TMX-1 TMX-2 TMX-3 TMX-4 TMX-5 TMX-6 TMX-7 TMX-8 TMX-9
sTMX-1 sTMX-2 sTMX-3 sTMX-4 sTMX-5 sTMX-6 sTMX-7 sTMX-8 sTMX-9

SUB-STORE DEPT./TYPE 1
TMX-S1-1 TMX-S1-2 TMX-S1-3 TMX-S1-4 TMX-S1-5 TMX-S1-6 TMX-S1-7 TMX-S1-8 TMX-S1-9
sTMX-S1-1 sTMX-S1-2 sTMX-S1-3 sTMX-S1-4 sTMX-S1-5 sTMX-S1-6 sTMX-S1-7 sTMX-S1-8 sTMX-S1-9

...

SUB-STORE DEPT./TYPE Y
TMX-SY-1 TMX-SY-2 TMX-SY-3 TMX-SY-4 TMX-SY-5 TMY-SY-6 TMX-SY-7 TMX-SY-8 TM1-SY-9
sTM1-SY-1 sTM1-SY-2 sTM1-SY-3 sTM1-SY-4 sTM1-SY-5 sTMY-SY-6 sTM1-SY-7 sTM1-SY-8 sTM1-SY-9

```
SUBSCRIBER # 123456789

PURCHASES
                    S              M              T              W              T              F              S              PER WEEK       PER MONTH
MERCHANT TYPE 1
# OF PURCHASES:
                    NP-MT1-1       NP-MT1-2       NP-MT1-3       NP-MT1-4       NP-MT1-5       NP-MT1-6       NP-MT1-7       NP-MT1-8       NP-MT1-9
                    sNP-MT1-1      sNP-MT1-2      sNP-MT1-3      sNP-MT1-4      sNP-MT1-5      sNP-MT1-6      sNP-MT1-7      sNP-MT1-8      sNP-MT1-9
$ OF PURCHASES:
                    DP-MT1-1       DP-MT1-2       DP-MT1-3       DP-MT1-4       DP-MT1-5       DP-MT1-6       DP-MT1-7       DP-MT1-8       DP-MT1-9
                    sDP-MT1-1      sDP-MT1-2      sDP-MT1-3      sDP-MT1-4      sDP-MT1-5      sDP-MT1-6      sDP-MT1-7      sDP-MT1-8      sDP-MT1-9

...

MERCHANT TYPE N
# OF PURCHASES:
                    NP-MTN-1       NP-MTN-2       NP-MTN-3       NP-MTN-4       NP-MTN-5       NP-MTN-6       NP-MTN-7       NP-MTN-8       NP-MTN-9
                    sNP-MTN-1      sNP-MTN-2      sNP-MTN-3      sNP-MTN-4      sNP-MTN-5      sNP-MTN-6      sNP-MTN-7      sNP-MTN-8      sNP-MTN-9
$ OF PURCHASES:
                    DP-MTN-1       DP-MTN-2       DP-MTN-3       DP-MTN-4       DP-MTN-5       DP-MTN-6       DP-MTN-7       DP-MTN-8       DP-MTN-9
                    sDP-MTN-1      sDP-MTN-2      sDP-MTN-3      sDP-MTN-4      sDP-MTN-5      sDP-MTN-6      sDP-MTN-7      sDP-MTN-8      sDP-MTN-9
```

SUBSCRIBER # 123456789

PURCHASES

|  | S | M | T | W | T | F | S | PER WEEK | PER MONTH |
|---|---|---|---|---|---|---|---|---|---|
| MERCHANT 1 | | | | | | | | | |
| # OF PURCHASES: | NP-M1-1 | NP-M1-2 | NP-M1-3 | NP-M1-4 | NP-M1-5 | NP-M1-6 | NP-M1-7 | NP-M1-8 | NP-M1-9 |
|  | sNP-M1-1 | sNP-M1-2 | sNP-M1-3 | sNP-M1-4 | sNP-M1-5 | sNP-M1-6 | sNP-M1-7 | sNP-M1-8 | sNP-M1-9 |
| $ OF PURCHASES: | DP-M1-1 | DP-M1-2 | DP-M1-3 | DP-M1-4 | DP-M1-5 | DP-M1-6 | DP-M1-7 | DP-M1-8 | DP-M1-9 |
|  | sDP-M1-1 | sDP-M1-2 | sDP-M1-3 | sDP-M1-4 | sDP-M1-5 | sDP-M1-6 | sDP-M1-7 | sDP-M1-8 | sDP-M1-9 |
| . . . | | | | | | | | | |
| MERCHANT N | | | | | | | | | |
| # OF PURCHASES: | NP-MN-1 | NP-MN-2 | NP-MN-3 | NP-MN-4 | NP-MN-5 | NP-MN-6 | NP-MN-7 | NP-MN-8 | NP-MN-9 |
|  | sNP-MN-1 | sNP-MN-2 | sNP-MN-3 | sNP-MN-4 | sNP-MN-5 | sNP-MN-6 | sNP-MN-7 | sNP-MN-8 | sNP-MN-9 |
| $ OF PURCHASES: | DP-MN-1 | DP-MN-2 | DP-MN-3 | DP-MN-4 | DP-MN-5 | DP-MN-6 | DP-MN-7 | DP-MN-8 | DP-MN-9 |
|  | sDP-MN-1 | sDP-MN-2 | sDP-MN-3 | sDP-MN-4 | sDP-MN-5 | sDP-MN-6 | sDP-MN-7 | sDP-MN-8 | sDP-MN-9 |

1400

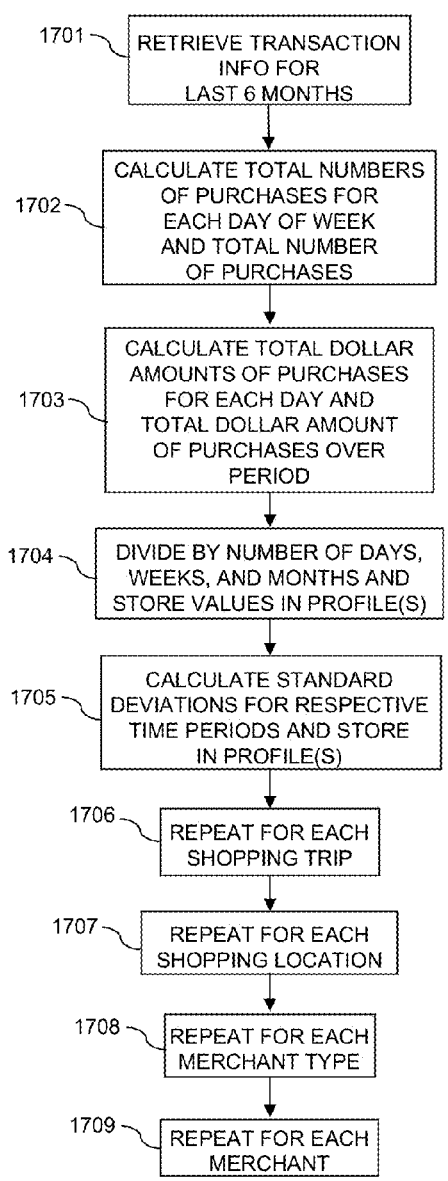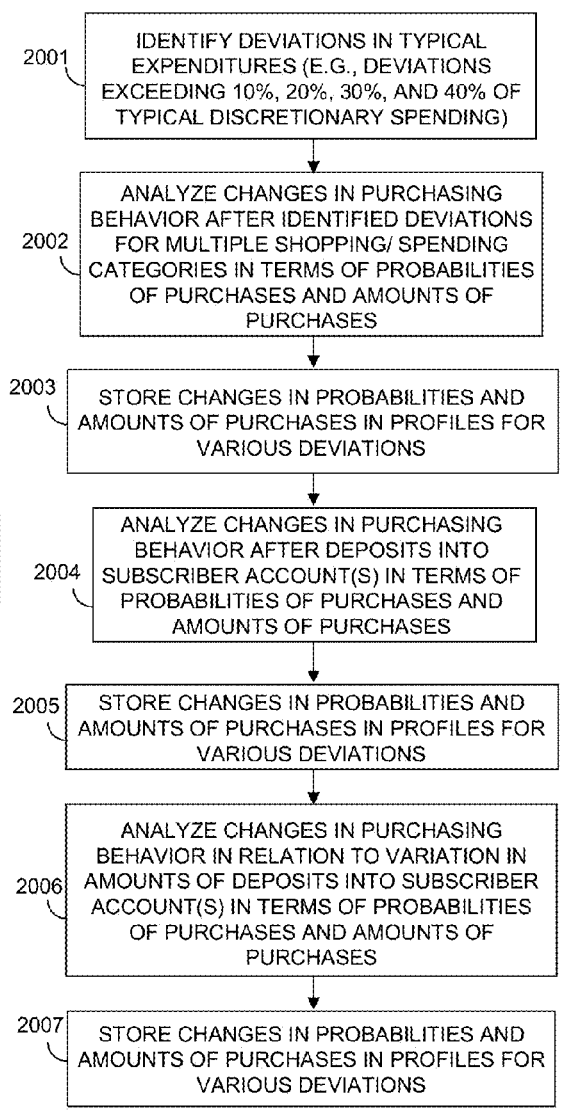

*FIGURE 19*

SUBSCRIBER # 123456789

CLOTHING SHOPPING PROFILE:

| S | M | T | W | T | F | S |
|---|---|---|---|---|---|---|
| 15% ($85) | 3% ($65) | 1% ($45) | 0% | 2% ($54) | 12% ($97) | 25% ($105) |

PERCENTAGE OF PURCHASES
MERCHANTS:               MERCHANT TYPES:
MERCHANT A: 33%          TYPE A: 43%
MERCHANT B: 17%          TYPE B: 27%
. . .                    . . .
MERCHANT X: 1%           TYPE Y: 10%

AVERAGE NUMBER OF TRANSACTIONS: 4
PER SHOPPING TRIP

TYPES OF GOODS REPEATEDLY PURCHASED:
GOODS A; GOODS B;....GOODS Z

INCREASED PROBABILITY IMMEDIATELY AFTER DEPOSITS: 50% INCREASE
INCREASED AVERAGE AMOUNT OF PURCHASE IMMEDIATELY AFTER DEPOSITS: 70% INCREASE

DECREASED PROBABILITY IMMEDIATELY AFTER OUT OF BUDGET EXPENSES: 20% DECREASE
DECREASED AVERAGE AMOUNT OF PURCHASE IMMEDIATELY AFTER OUT OF BUDGET EXPENSES: 50%
DECREASE

CROSS-ACTIVITY CORRELATION:
DINING - UPSCALE BISTRO - LUNCH: 76%

. . .

PERSONAL SERVICES - HAIRSTYLING AND SPA ACTIVITIES: 55%

METHOD OF CONDUCTING SOCIAL NETWORK APPLICATION OPERATIONS

RELATED APPLICATIONS

This application is a continuation of U.S. patent application Ser. No. 13/586,839, filed Aug. 15, 2012, which is incorporated by reference.

BACKGROUND

Location based services refer generally to services that provide information to a user in relation to the location of the user. Many prior location based services are relatively pedestrian in nature and provide relatively simple information. An example of a known location based service is a "weather" service in which the user's zip code is provided to the service (e.g., through a conventional HTML webpage, a WAP or other cellular phone interface, etc.) through a network and the service responds by communicating the current weather conditions and the forecast for several days. Other known location based services provide "social" applications such as allowing users to determine each other's locations, receive notification when a friend comes within a predetermined distance, and similar operations. Another type of location based services are generally referred to as "McDonalds finders" that provide search results in a map form (e.g., searching for specific locations of restaurants/stores within a given distance of the user). Other location based services have proposed delivering various types of "advertising" (e.g., when a user arrives at an airport, various ads can be delivered to the user's cellular phone). However, many such prior advertising location based services are quite simplistic and do not possess any appreciable intelligence for selecting advertisements beyond the location of the user.

SUMMARY

In one embodiment, a method of conducting operations for a social network application, comprises: generating a notification list of recent activities of users of the social network application, wherein the notification list includes (1) at least one activity within the social network application of a first user and (2) at least one hyperlink to an offer involving an activity that is directly related to at least one activity of the first user, wherein an account of the first user defines at least one notification rule for controlling visibility of the at least one activity to other users of the social network application; and providing the notification list to a second user, that is a friend of the first user within the social network application, according to the at least one notification rule of the first user.

In one embodiment, a method of providing a location based service (LBS), comprises: (i) receiving location information over a period of time by one or more software programs from a plurality of wireless devices belonging to a plurality of subscribers; (ii) processing the location information to detect that respective subscribers tend to spend time at one or more locations with one or more other specific subscribers; (iii) storing data indicative of a tendency of each such subscriber to spend time with the subscriber's one or more other specific subscribers; (iv) detecting whether subscribers are present at locations with one or more specific subscribers identified in the stored data subsequent to performance of (ii) and (iii); and (v) comparing ad parameters against subscriber data, to select ads for communication to subscribers, wherein the comparing differentiates in selection of ads for communication to subscribers in response to (iv).

In another embodiment, the activities identified in the logs are defined in a hierarchical manner. In another embodiment, the logs identify when an activity has been completed. In another embodiment, the logs indicate completion of financial transactions with merchants.

In one embodiment, the server for LBS services comprises: one or multiple databases storing information identifying subscribers of one or several LBS or other applications, wherein the one or multiple databases identifies groups of subscribers that have been detected to be located in close physical proximity on multiple occasions; one or multiple databases for storing advertisements to subscribers; code for determining whether subscribers are currently clustering based upon location information pertaining to subscribers; and code for selecting and communicating advertisements to subscribers based on locations of the subscribers, wherein the code for selecting and communicating determines selects ads for subscribers depending upon whether subscribers have been determined to be clustering.

In another embodiment, a method comprises the operations performed by the one or more first programs, by the one or more second programs, and/or the LBS applications.

In another embodiment, a method of providing a location based service (LBS), comprises: receiving location information by one or more software programs from a plurality of wireless devices belonging to a plurality of subscribers of one or more location based services; processing the location information, by one or more software programs, to identify activity of subscribers at merchant locations; maintaining a respective profile, by one or more software programs, for each of the plurality of subscribers that reflects norm shopping activity for the respective subscriber; comparing information pertaining to current or recent shopping activity, by one or more software programs, for each subscriber of the plurality of subscribers against information stored in the profile of the respective subscriber; selecting ads, by one or more software programs, for each subscriber of the plurality of subscribers in relation to the comparing; and communicating, by one or more software programs, the selected ads to plurality of wireless devices belonging to the plurality of subscribers.

The selects ads can be communicate to wireless devices while the plurality subscribers are conducting current shopping activity. In another embodiment, each profile comprises one or more activity norm parameters for a plurality of merchant types.

In another embodiment, a method communicates information to users of a social network application. The method comprising: operating at least one social network application server for interacting with users of the social network application, wherein at least some of the users of the social network application are users of wireless subscriber devices; providing a first mobile application for interacting with the social network application, wherein (i) the first mobile application is further operable to employ geolocation functions of a respective wireless device to communicate geolocation information to one or more servers of hardware and software of the social network application, (ii) the first mobile application is operable to automatically to upload photos to a respective user account with text-limited descriptive information manually entered by the respective user for posting on a webpage of the social network application for the respective user, and (iii) at least some entries of text-limited descriptive information communicated from the first mobile application and received by the one or more servers of the social network application are indicative of current activities of respective subscribers; logging activities of users of the social network application using at least information received from the first mobile application, wherein the logged activities include real-world activities of users of the social network application; receiving app usage information from a plurality of second mobile applications of different types by one or more servers of hardware and software, wherein (i) each of the plurality of second mobile applications is (a) different from a web browser application and (b) different from a social network application, (ii) the plurality of second mobile applications include at least mobile gaming applications, mobile digital content applications, and shopping-related mobile applications, and (iii) the second plurality of mobile applications are functionally integrated with the social network application to share subscriber activities across the first mobile application and the second plurality of applications; combining app usage information from the second plurality of mobile applications and social network application activities to create combined activity listings of user activities for respective users including information from the first mobile application and information related to usage of the plurality of second mobile applications; presenting the combined activity listings to viewing users in respective webpages by one or more web servers; selecting ads according to ad parameters for distribution to users of the social network application, wherein the selected ads are selected, at least in part, using app usage information; and communicating the selected ads to users of the social network application.

The foregoing has outlined rather broadly certain features and/or technical advantages in order that the detailed description that follows may be better understood. Additional features and/or advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the appended claims. The novel features, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the appended claims.

BRIEF DESCRIPTION OF THE DRAWINGS

FIG. 4 depicts a flowchart for processing cluster data according to one representative embodiment.

FIG. 5 depicts a flowchart for utilizing cluster information according to one representative embodiment.

FIG. 6 depicts a flowchart for utilizing cluster information according to another representative embodiment.

FIGS. 7-14 depict activity norm summary information that can be compiled or calculated for use in selecting ads to communicate to subscribers according to some representative embodiments.

FIGS. 15-17 depict respective flowcharts for processing activity information and/or financial transaction information to generate respective norm parameters for storage in subscriber profiles according to some representative embodiments.

FIGS. 18 and 19 depict activity norm profiles and for different merchant types according to some representative embodiments.

FIG. 20 depicts activity norm analysis that cross-correlates selected financial transaction behavior to other subscriber behavior.

DETAILED DESCRIPTION

Some representative embodiments are directed to systems and methods for monitoring data associated with users of location based services and directing advertisements to the users. Some representative embodiments are directed to distribution of mobile applications. Some representative embodiments are directed to generating, processing, and/or using behavioral analytics. Some representative embodiments are directed to communicating ads for presentation to mobile devices and/or static processor based systems. Some representative embodiments are directed to social network applications.

Figure 1:
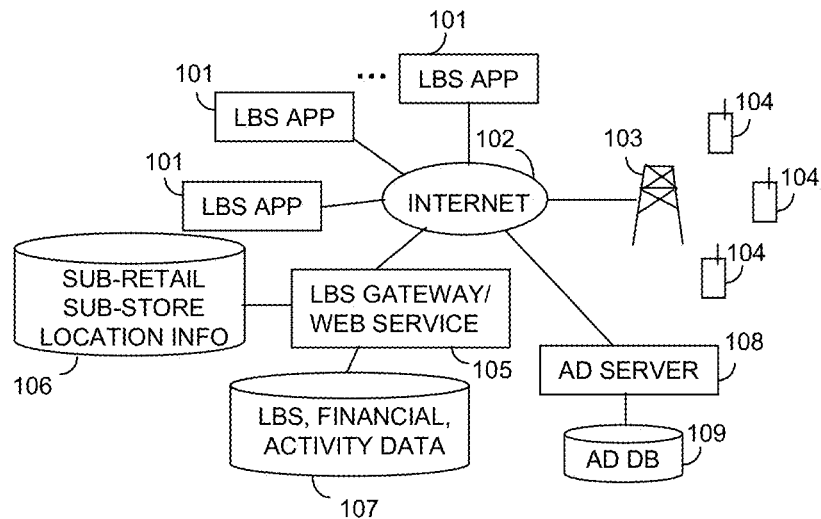
FIG. 1 depicts a system in which multiple LBS applications and other applications provide location based services to multiple subscribers and in which advertisements can be directed to the multiple subscribers using multiple types of information according to one representative embodiment.

Referring now to the drawings, FIG. 1 depicts a system in which multiple LBS applications and other application servers 101 (also referred to herein as "applications," "mobile applications," or "mobile apps" for convenience depending upon context) are provided for communication with multiple subscriber devices 104 and in which advertisements can be directed to the multiple subscribers 104 using multiple types of information. Applications 101 may include one or more social network applications such as the social network applications described in the APPENDICES of PCT Publication WO 2008/082794 A2. Applications 101 may include one or more search applications such as the search applications described in the APPENDICES of PCT Publication WO 2008/082794 A2.

As shown in FIG. 1, there are preferably a plurality of applications 101 that provide location based services or other services to subscriber devices 104. Applications 101 can provide conventional location based services such as map/navigation services, weather services, local merchant search services, etc. Applications 101 can further include financial or shopping location based services as described in U.S. Provisional Patent Application No. 60/736,252, filed Nov. 14, 2005, 60/759,303, filed Jan. 17, 2006 and 60/773,852, filed Feb. 16, 2006, which are all incorporated herein by reference in their entirety. Applications 101 can include "social" applications or gaming applications that facilitate different types of subscriber interaction. LBS applications 101 may receive location information that is indicative of the current location of subscribers 104 and communicate LBS information to the subscribers 104 according to the location information either upon request by the subscribers 104 or automatically depending upon the nature/purpose of the particular LBS application 101. The application data is possibly communicated through Internet 102 and a wireless network 103 (e.g., a cellular network) to subscribers 104. The subscriber devices 104 can be any type of suitable wireless device (e.g., cellular phones, "smartphones," wireless e-mail devices, wireless capable PDAs, etc.) that possess the ability to determine their approximate current location or communicate through a network that enables the approximate location to be determined.

Applications 101 may also communicate with gateway/web service 105. In preferred embodiments, subscriber devices 104 communicate their current location to gateway/web service 105. Also, as subscriber devices 104 access various LBS applications 101, subscriber devices 104 communicate their activation of an LBS or other application to gateway/web service 105. Such location and device use data may be employed for the selection of ads for presentation to users of subscriber devices 104 as discussed herein. Gateway/web service 105 then may intermediate communication between the selected application(s) 101 and the respective subscriber devices 104. Thus, subscribers 104 may access multiple applications through the same source (or may coordinate selected communication through a common server or service). Also, subscribers 104 may only need to communicate their current location to the same destination which is then available to any application 101 as appropriate.

Although gateway/web service 105 provides such gateway services, the gateway services are not critical to all embodiments. In some embodiments, subscriber devices 104 and/or applications 101 can report to web service 105 (i) the current location of subscribers 104 to web service 105 as subscribers 104 utilize their respective applications and (ii) when a respective subscriber 104 accesses an application and ceases use of the application (if applicable).

Gateway/web service 105 updates and/or maintains a log of locations where subscribers 104 visited in DB 107. Also, gateway/web service 105 maintains a log of interaction with or access to particular LBS or other applications 101. Any suitable app usage information may be communicated to gateway/web service 105 such as transactions, app-specific actions, social interactions facilitated through one or more apps, etc. Additionally, gateway/web service 105 may maintain a log of financial transactions completed by various subscribers as identified by financial applications 101 (e.g., a budget application, a fraud monitoring LBS application, etc.) and communicated to gateway/web service 105.

Gateway/web service 105 utilizes the location information, application interaction information, and/or financial information to infer the activities performed by the subscribers and the current activity being performed by the subscribers. The logs of activities for subscribers and current activities being performed are stored in DB 107. The logs of activities enable more accurate selection of ads, incentives, offers, etc. to be directed to subscribers as will be discussed below. In some embodiments, the log activities are formed into one or more listings (possibility in sequential time order) for viewing by viewing users in webpages via one or more webserver. The viewing users may be advertisers. Alternatively, the viewing users may be "friends" of a given user in a social network application.

In some embodiments, the following activities and sub-activities are defined: (i) commuting; (ii) work; (iii) school; (iv) dining—(a) fast food; (b) casual; . . . fine dining; (v) entertainment—(a) movie; (b) music venue; . . . bar; (vi) sports/recreation—(a) health club; (b) golf; (c) athletic complex/fields; . . . gaming; (vii) shopping—(a) groceries; (b) gas; (c) clothing, shoes, accessories; (d) home decoration; (e) home improvement; . . . sports equipment; (viii) social; (ix) traveling/vacation, etc. Of course, these activities and sub-activities are by way of example and any other activities and/or sub-activities could be additionally or alternatively employed. Also, it shall be appreciated that the activities need not be mutually exclusive in that a single subscriber could be engaged in multiple activities at the same time. The information can be encoded in any suitable ontology. For example, a hierarchical classification of the types of locations could be formulated. In one embodiment, specific merchants are defined within the hierarchical framework within shopping related activities. An example branch in such a hierarchical framework could be RETAIL: shopping: big-box store: TARGET®: grocery section. In alternative embodiments, any such hierarchical descriptors assignable to locations that indicate the nature of the activity being undertaken by a subscriber may be employed. In some embodiments, many of the activities and sub-activities are related to activities at physical locations (e.g., specific locations, specific merchants, etc.).

In some embodiments, a current activity of a subscriber can be inferred from the type of application that the subscriber is accessing. For example, if a subscriber is utilizing a navigation LBS application and the subscriber has not reached their destination, it may be inferred that the subscriber is commuting. If a subscriber is utilizing a social application, certain activities (work, school, etc.) can be eliminated or considered less probably or relevant while other activities can possess a greater probability (e.g., dining, entertainment, etc.). Accordingly, when gateway/web service 105 attempts to infer the current activity of a subscriber, gateway/web service 105 identifies the applications that are currently active for the subscriber.

In some embodiments, gateway/web service 105 utilizes information in DB 106 to infer the activity of the user. In general, DB 106 correlates specific locations to one or several specific activities. For example, DB 106 can be constructed by "mapping" the addresses or coordinates of residential areas, retail districts, schools, health care facilities, sports/athletic facilities, etc. to the particular activities that are customary to those types of locations. Additionally, DB 106 includes information at several geospatial "resolution" levels. In some embodiments, DB 106 comprises geo-coordinates or other spatial information that define (i) various retail districts at a higher level, (ii) specific malls, strip-malls, stand-alone stores, etc. within a retail district, (iii) specific stores; and (iv) sub-store locations. In sub-store locations, the specific goods or specific service provided can be identified. By maintaining a log of the locations visited by a subscriber and the amount of time spent at the locations, the activities of a user can be estimated. Sub-store locations can be determined utilizing any number of mechanisms and/or algorithms. For example, a GPS receiver could be employed provided the GPS receiver possesses sufficient antenna gain and sufficient reception within the store. Alternatively, many retail locations utilize multiple WiFi access points. The particular ID's of the WiFi access points that are detectable and/or the relative signal strength of the WiFi access points can be utilized for an intra-store location determination. Also, sub-store locating functionality can be utilized to ascertain whether a subscriber has made a purchase at a particular merchant. For example, if a subscriber has spent an amount of time near a location where a cash-register is known to be present and the subscriber leaves the store after being at that location, it may be inferred that the subscriber has made a purchase at that store.

Financial information captured by financial related LBS applications 101 can be used to augment the identification of subscriber activities. In such financial related applications 101, the applications monitor user accounts for the completion of transactions (e.g., credit or debit card transactions). Using the merchant information (merchant ID, merchant name, merchant classification, etc.) in the transaction information, the activity can be more closely estimated. For example, if a user is located within a mall and the user previously purchased items at a clothing store, the specific current shopping activity can be inferred to include clothing shopping even though the user may temporarily depart from stores containing such items. Alternatively, transaction information may signal that a particular activity has been completed by the user. For example, if a user makes a purchase at a grocery store that is typical for their weekly grocery purchases, one can conclude that the user will not be conducting further significant grocery shopping for some amount of time. Transaction information can be obtained using the systems disclosed in APPENDIX A of PCT Publication WO 2008/082794 A2.

As an example of a user log could be given by: 6:00 am-8:30 am: undefined; 8:30 am-9:00 am: banking; 9:15 am-10:20 am: grocery shopping; 12:15 pm-1:00 pm; dining (fast food); 1:30 pm-2:00 pm: commuting: 2:00 pm: begin shopping (clothing): clothing purchase made at 2:35 at young women's depart. of dept. store retailer. In some representative embodiments, logs can be reviewed by advertisers. The viewing of activities or selected portions thereof may be conditioned upon subscriber privacy preferences. In alternative embodiments, the logs are not actually reviewable by advertisers. Instead, the logs are merely maintained in DB 107 and advertising parameters are compared against the information in the logs to direct advertisements.

By providing such a log of activities (previously performed and currently performed), a more intelligent selection of ads for communication to the subscriber can occur. For example, when the grocery shopping activity has been completed, selection of ads for specific grocery items will have relatively little value. Depending upon the purchasing behavior of the subscriber, it may be advantageous to send the subscriber clothing-related advertisements while the subscriber is clothing shopping (even after one or several purchases have been made). Alternatively, if the subscriber has already spent more than the subscriber usually spends as reflected in the prior purchases, it may not be advantageous to send more clothing advertisements since the subscriber may have already spent their limit and is only currently "browsing," i.e. the probability of further purchases can be estimated as being low.

In some embodiments, activity norms and financial norms (e.g., selected behavioral analytics) are calculated by observing subscriber behavior over a period of time. For the purpose of this application, the term "norm" parameter refers to a parameter that is indicative of a general level or average for the particular subscriber. For example, for grocery shopping norms, the typical period between grocery shopping (e.g., in days), the typical day(s) for grocery shopping, the average amount spent, the range of amounts spent, the standard deviation of amounts spent, the type of stores in which grocery shopping occurs, etc. can be compiled from location information and financial information obtained by LBS applications. As another example, for clothing-type shopping norms, the typical day(s) for shopping, the average amount spent, the standard deviation of amounts spent, the number of transactions per shopping event, the average amount of time spent shopping at a particular retail location and/or per day, the types of stores visited, etc. can be compiled, the types of items purchases (if known), etc. can be compiled. Also, correlation between activities can be compiled. For example, it may be observed that a particular subscriber may routinely engage in a "dining (fast food)" activity after engaging in "recreation—sports complex" activity. Subscriber activity and/or financial norms are then compared against subscriber's more recent activities for the purpose of ad selection.

By compiling such information, intelligent selection of ads for subscribers may occur. In preferred embodiments, advertisers upload ads into ad DB 109 through ad server 108. Also, the advertisers specify any specific ad parameters for association with their various ads. The ad parameters are compared by ad server 108 against subscriber information and the activity information and norm information in DB 107. When the information in DB 107 satisfies the ad parameters for particular subscribers, the respective ad(s) are communicated to those subscribers by ad server 108. Any other ad selection criteria can be employed. For example, the ads of certain advertisers can be prioritized based upon purchased ad placements. The payment of ads may include payments to prioritize ad placement according to any ad parameter discussed herein or in the APPENDICES of PCT Publication WO 2008/082794 A2. For example, payments for ad placements may occur according to purchasing norm parameters, clustering parameters, shopping timing parameters, etc. which are discussed below. The payments for ad placements may also utilize any such parameters in combination or in combination with other subscriber data. For example, an advertiser may pay for ad placements for subscribers that typically spend greater than $200 per shopping trip, shop at a specific type of retail establishment, and that fit a given demographic profile. All such combination of ad parameters are contemplated according to some representative embodiments.

Figure 2:
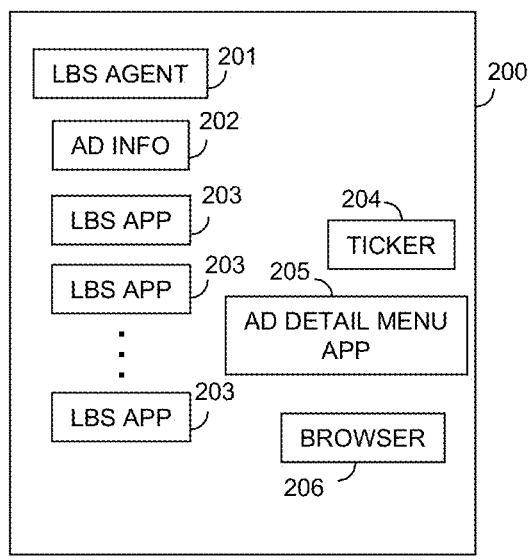
FIG. 2 depicts a block diagram of a subscriber device adapted for delivery of advertisements according to one representative embodiment.

Referring now to FIG. 2, subscriber device 200 is shown that is adapted for delivery of advertisements according to one representative embodiment. Subscriber device 200 can be any suitable wireless device, such as a cellular phone, that is capable of executing software instructions. The software instructions on subscriber device 200 preferably include multiple LBS or other mobile applications 203. The local applications 203 may contact remote LBS or other application servers 101 to deliver the application-based information to the subscriber. Subscriber device 200 further includes LBS agent 201. LBS agent 201 preferably manages or intermediates the communication of location LBS applications 203 with remote LBS applications 101 and/or gateway service 105. LBS agent 201 preferably forwards location information to the appropriate LBS applications 101 and/or gateway service 105 at times defined by the respective applications. Also, LBS agent 201 may receive messages from applications 101 and forwards the messages to the respective local applications 203. LBS agent 201 simplifies the implementation of LBS applications 203 and prevents conflict or difficulties in the execution of local LBS applications 203. Also, LBS agent 201 can manage updates to any LBS functionality that is common to all LBS applications 203 or one or several specific LBS applications 203.

Subscriber device 200 further comprises software for presenting ads to subscribers in an efficient manner. In one embodiment, subscriber device 200 comprises ticker software application 204 and ad detail menu application 205. In preferred embodiments, some ads are communicated to LBS agent 201 of subscriber device 200 using SMS messaging. The SMS messages preferably detail how the ad is to be presented to the subscriber. Preferably, the SMS messages detail whether the ad is to be placed into a ticker, for how long, and what particular text is to be displayed in the ticker. A ticker generally refers to a scrolling stream of characters on a screen of the wireless device (e.g., that mimics a "ticker-tape" in electronic form). LBS agent 201 provides the appropriate information to ticker software application 204 to display to the user when the user reviews the screen of subscriber device 200 (e.g., when the subscriber opens his/her phone). Also, the SMS messages preferably detail information to be placed in a menu type form that provides a more detailed presentation of ads for subscriber review. Also, should a subscriber desire to view additional detail for an ad or download a digital coupon, a hyperlink can be included for user selection that causes browser application 206 to download the corresponding content. In other embodiments, ads may be presented directly within mobile apps. The mobile apps may also permit a user to click on an ad to "click through" to more detailed ad presentation via a browser application as an example.

In some embodiments, "digital coupons" are communicated to subscriber devices 104 through the ad selection functionality of ad server 108 and ad DB 107. The digital coupons are preferably implemented by use of a digital image encoded according to a digital rights management (DRM) scheme. The digital image can display the "coupon" details, such as product/store/location/purchase conditions, the amount of the coupon, etc. Also, the digital image preferably includes a "code" (e.g., an alphanumeric string) that authenticates the validity of the coupon. When a subscriber wishes to use a digital coupon, the user can present the screen of the subscriber device 104 displaying the digital coupon to a clerk of a merchant. A merchant that has previously agreed to accept such digital coupons can enter the code into the merchant's POS device during a transaction. The merchant's system can then determine the validity of the coupon in real-time by communicating the code to a suitable server. Upon determining the validity of the coupon, the merchant's POS device can suitably adjust the transaction total. Also, the merchant's system can use the code to obtain settlement of the coupon amount at a later appropriate time using the code.

The DRM functionality can be used for several purposes in the digital coupon process. In some embodiments, the DRM functionality ties the digital coupon to a specific subscriber device 104, i.e., the digital image is not decrypted by other subscriber devices. Also, in some embodiments, location information can be encoded within the DRM rules. For example, spatial coordinates and a radius distance can be defined such that the digital image is only decrypted by the DRM software when the user is within the area defined by the spatial coordinates and the radius distance (to ensure that the coupon is only presented at desired retail locations/merchants, etc.). That is, the DRM software accesses the current location of the subscriber device 104 and selectively decrypts the digital image by comparing the current location to the location rules defined in the DRM license associated with the digital coupon.

In some embodiments, a short "ad" of several seconds (e.g., a promotional video) is incorporated with a digital coupon. When a subscriber initially reviews the digital coupon, the promotional video is played. After the promotional video is played, the digital image containing the coupon information is then displayed. The DRM license can contain a DRM rule that causes the video to be deleted upon review for the purpose of minimizing the memory usage of the digital coupon over time.

Some representative embodiments can provide a number of advantages. For example, by maintaining a database of sub-locations within specific stores and the types of goods at those sub-locations, intelligent selection of ads for delivery to subscribers can occur. For example, in ordinary e-advertising and LBS advertising, it is most likely never useful to communicate an advertisement for an inexpensive, somewhat common-place food item. That is, the ad will have a very low probability of affecting the subscriber's purchasing activities. However, if it is known that a subscriber is standing in a particular grocery aisle of a "big-box" retailer that contains that type of food item according to representative embodiments, communication of such an ad may make economic sense because the probability of the ad being successful in affecting the purchasing behavior is much higher than if the ad were communicated when the subscriber is at another type of location.

Additionally, by providing a log of activities, selection of ads for subscribers can occur in a much more efficient and effective manner that possible according to conventional LBS applications. That is, subscriber activities provide a more reasoned basis for estimating the appropriateness of an ad for a subscriber than the mere current location of the subscriber. Also, by aggregating data over time and data from multiple sources, the activities of a subscriber can be more accurately inferred. Also, by compiling historical norms, the effectiveness of an advertisement in affecting immediate purchasing behavior can be more readily determined.

FIGS. 7-14 depict activity norm summary information 700, 800, 900, 1000, 1100, 1200, 1300, and 1400 that can be compiled or calculated for use in selecting ads to communicate to subscribers according to some representative embodiments.

FIG. 7 depicts activity summary profile 700 according to one representative embodiment. Activity summary profile 700 stores information that indicates the amount of time spent by a subscriber for a plurality of activities. Also, the information is provided in a hierarchical manner. Specifically, the amount of time is shown for various sub-activities. As shown in FIG. 7, for ACTIVITY 1, the average amounts of time spent for ACTIVITY 1 per day of the week (Sunday through Saturday) are represented by parameters V1-V7. The standard deviations for the amounts of time spent for ACTIVITY 1 per each day of the week are represented by parameters s1-s7. The average amounts of time spent per week and per month for ACTIVITY 1 are represented by parameters V8 and V9 and the standard deviations for time spent per week and per month are represented by s8 and s9. In a similar manner, average amounts of time and standard deviations are shown for SUBACTIVITIES, i.e., (V'1-V'9, s'1-s'9) for a first sub-level activity and (V"1-V"9, s"1-s"9) for a second sublevel activity. Any suitable number of subactivities and levels of subactivities could be so provided. As shown in FIG. 7, this type of information is repeated for a plurality of activities (through "ACTIVITY N").

Figure 8:
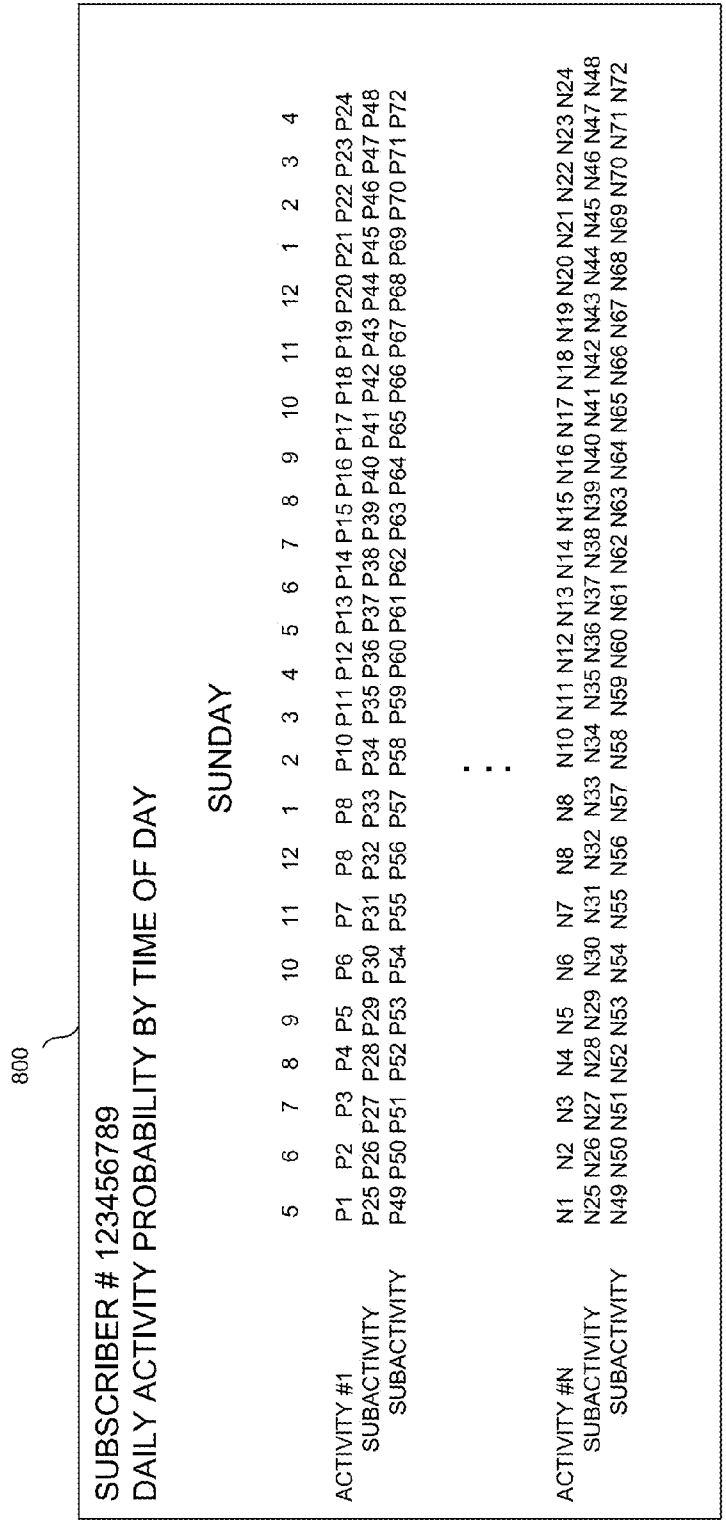

FIG. 8 depicts activity probability profile 800 according to one representative embodiment. Activity probability profile 800 is defined for one day of the week (i.e., Sunday). Preferably, similar profiles (not shown) are defined for other days of the week. Profile 800 defines the probability that a subscriber will engage in a particular activity within a given time frame. For example, the probability that the subscriber will engage in ACTIVITY 1 between 5am and 6am is defined by the parameter P1. Likewise, the probabilities for the other hours of the day for ACTIVITY 1 are defined by parameters P2-P24. Probabilities for hierarchical subactivities are shown in parameters P25-P48 and P49-P72. Probabilities are preferably defined for a plurality of activities through ACTIVITY N.

FIG. 9 depicts shopping activity profile 900 according to one representative embodiment. Profile 900 comprises relatively high level shopping summary information. Profile 900 comprises the average amounts of time spent shopping per each day of the week, per week, and per month in parameters X1-X9. The standard deviations for these times are shown in parameters x1-x9. The shopping frequencies for these time periods are represented by parameters F1-F9. The shopping frequency represents the average number of discrete shopping trips taken by the subscriber for the respective time period. The standard deviations for the shopping frequency for these periods are represented by parameters f1-f9. The average amounts of time per shopping trip are represented by parameters T1-T9 for these time periods with the standard deviations represented by parameters t1-t9.

The average amounts of time spent shopping per shopping location (e.g., MALL X, MALL Y, . . . MALL Z, etc.) is shown for a plurality of locations for these time periods. The locations are preferably retail locations in which there are multiple merchant stores in relatively close proximity such as a mall or retail district. For LOCATION 1, the average amounts of time for the various time periods are represented by parameters L1-L9 with the standard deviations represented by parameters 11-19. Also, the average numbers of stores visited by retail location for the time periods for LOCATION 1 are represented by parameters SL1-SL9 with the standard deviations represented by parameters s11-s19. Similar parameters are defined for a plurality of locations (as shown through LOCATION Z).

Figure 10:
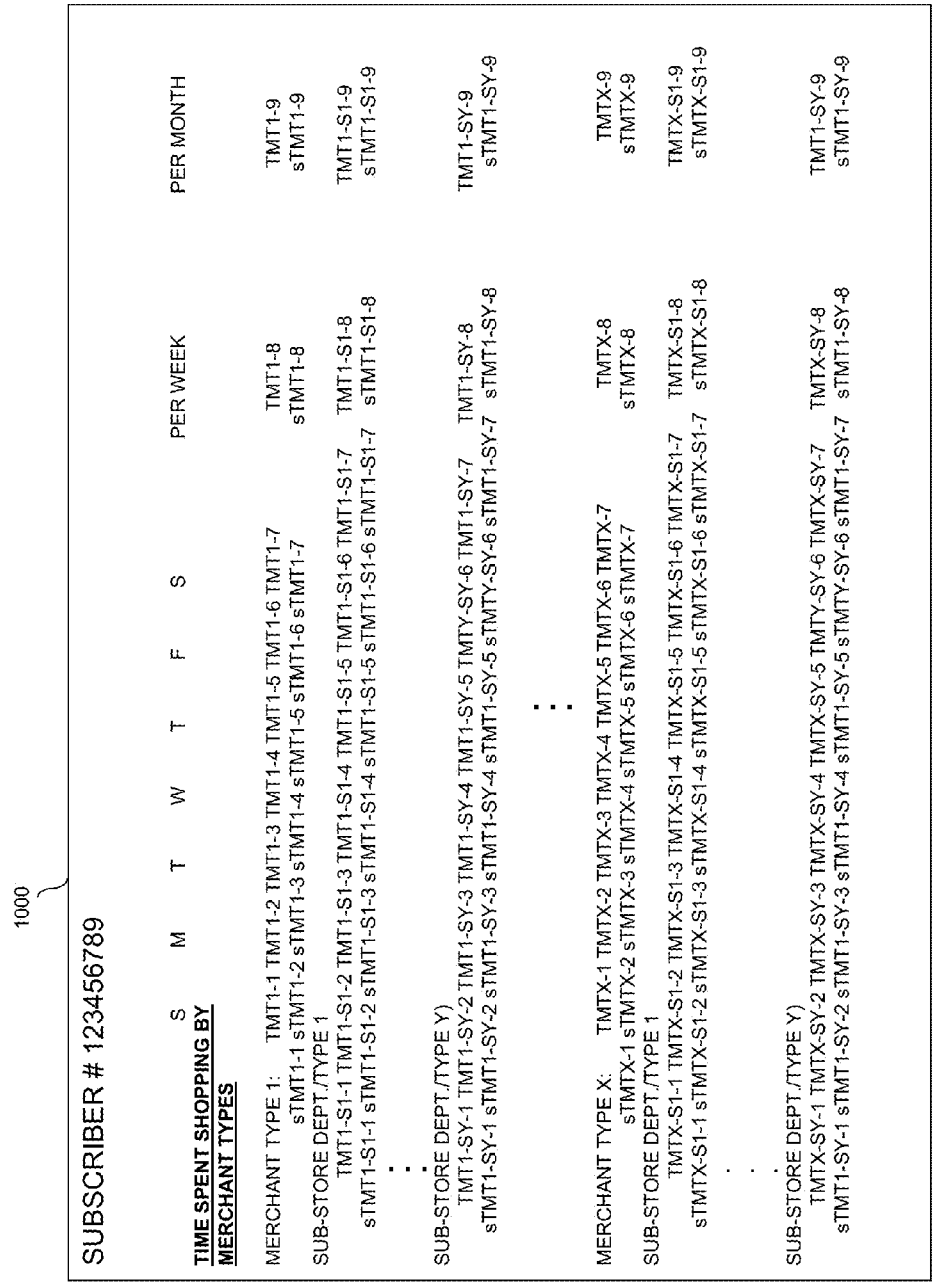

FIG. 10 depicts merchant type shopping profile 1000 according to one representative embodiment. Profile 1000 preferably stores average amounts of time spent shopping for a plurality of merchant types (e.g., clothing retailers, electronics retailers, bookstores, big-box retailers, grocery retailers, etc.). Also, the standard deviations are defined (denoted by the "s" prefix). The amounts of time and standard deviations are preferably calculated or compiled for each day of the week, per week, and per month time periods. Also, average amounts of time and standard deviations are defined for sub-store locations or departments for various merchant types. Such information is preferably compiled or calculated for a plurality of merchant types (shown as MERCHANT TYPE 1 through MERCHANT TYPE X). FIG. 11 depicts merchant shopping profile 1100 according to one representative embodiment. Profile 1100 stores the same type of information as profile 1000 except the information pertains to specific merchants as opposed to types of merchants.

Figure 12:
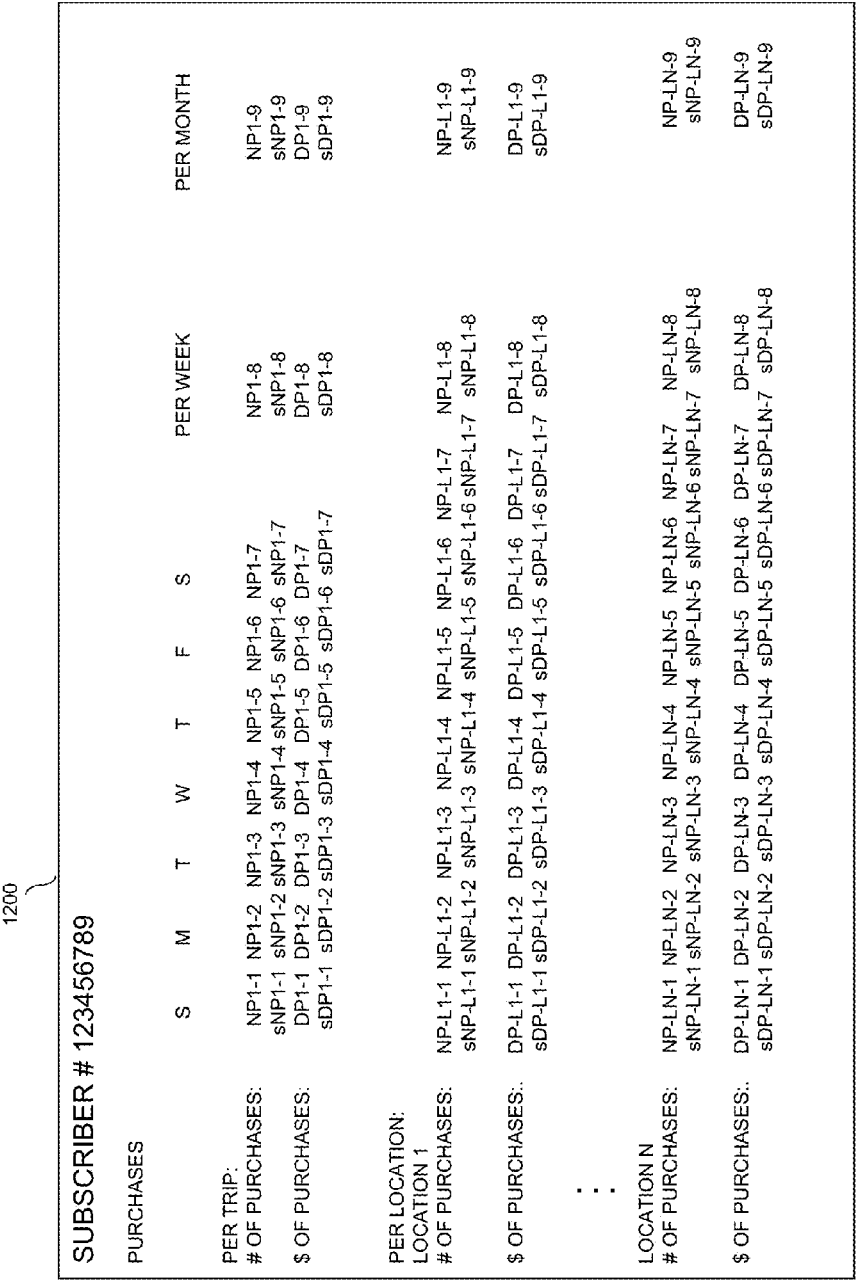

When financial transactions are monitored and logged, shopping activity norms in terms of purchases are preferably compiled or calculated. FIG. 12 depicts shopping purchase profile 1200 according to one representative embodiment. Profile 1200 stores average numbers of purchases per shopping trip (parameters NP1-1 through NP1-9) and average amounts spent per shopping trip (parameters DP1-1 through DP1-9) for each day of the week, per week, and per month time frames. The standard deviations for these values are also given (parameters sNP1-1 through sNP1-9 and sDP1-1 through sDP1-9). Average numbers and amounts of purchases for locations are defined (LOCATION 1 through LOCATION N) as shown in parameters NP-L1-1 through NP-L1-9 . . . NP-LN-1 through NP-LN-9 and DP-L1-1 through DP-L1-9 . . . DP-LN-1 through DP-LN-9. Standard deviations are also defined for the locations for these time frames as shown in parameters sNP-L1-1 through sNP-L1-9 . . . sNP-LN-1 through sNP-LN-9 and sDP-L1-1 through sDP-L1-9 . . . sDP-LN-1 through sDP-LN-9. Merchant type purchase profile 1300 (FIG. 13) and merchant purchase profile 1400 (FIG. 14) depict similar purchase information (number of purchases, dollar amounts, standard deviations) by merchant types and specific merchants.

Figure 15:
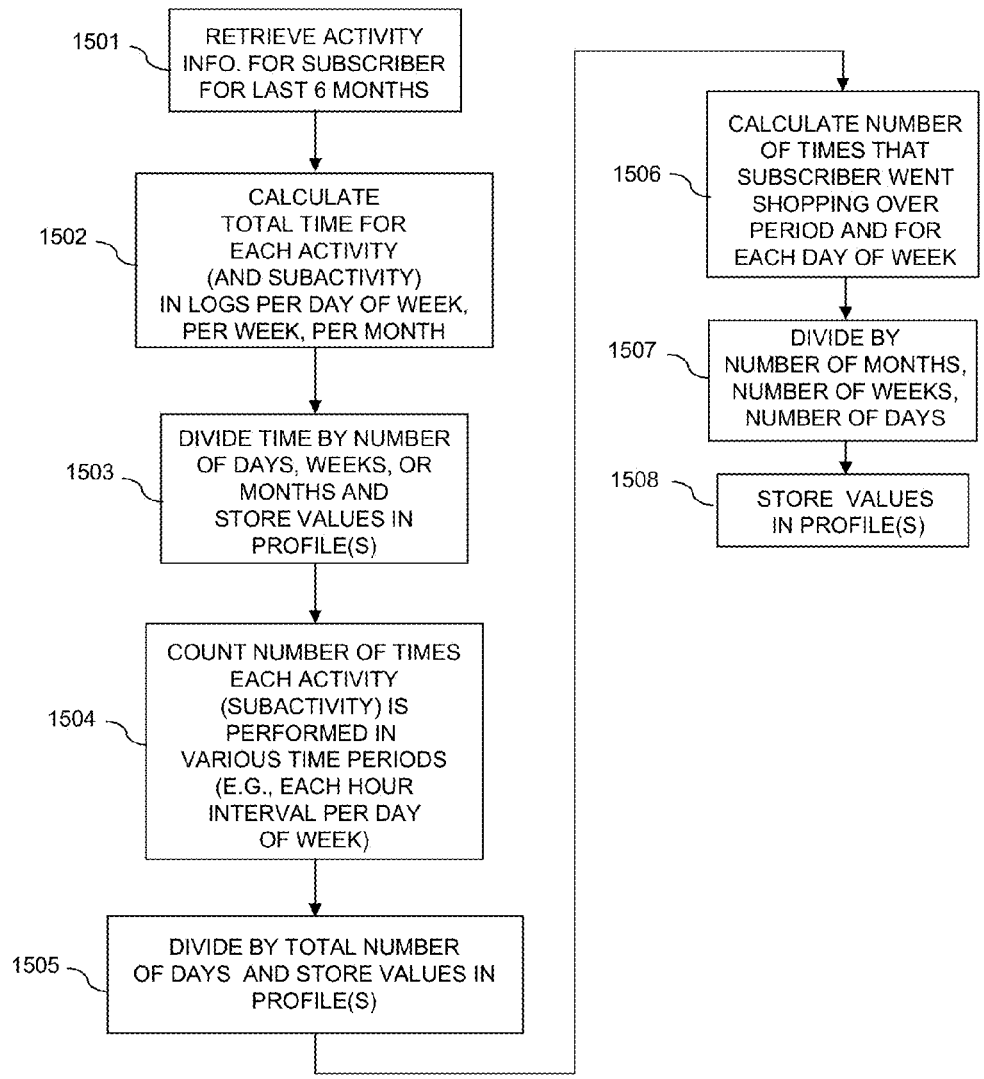

FIG. 15 depicts a flowchart for processing shopping activity information for a respective subscriber to generate profile information according to one representative embodiment. In 1501, activity information is retrieved for the last 6 months in a preferred embodiment (although any other suitable length of time could be selected). The activity information is preferably retrieved from pre-existing activity logs according to one embodiment. Alternatively, location based information could be retrieved and correlated to activities in conjunction with the norm building process. In 1502, total time is calculated for each activity (and subactivity) per day of week, per week, per month. In 1503, the total amounts of time are divided by the numbers of each of days of the week, the number of weeks, and the number of months for the selected period of time. The values are stored in one or more profile(s).

In 1504, the number of times that each activity (subactivity) was performed in various time periods (e.g., each hour interval per day of week) is calculated. In 1505, the numbers of times for each activity/subactivity are divided by the total numbers of each of the days of the week in the selected period of time and the resulting values are stored in one or more profile(s).

In 1506, the number of times that the subscriber went shopping over the selected period and for each day of week are calculated. In 1507, the calculated numbers of times are divided by the number of months, the number of weeks, and the number of days, respectively. The resulting values are stored in one or more profile(s).

Figure 16:
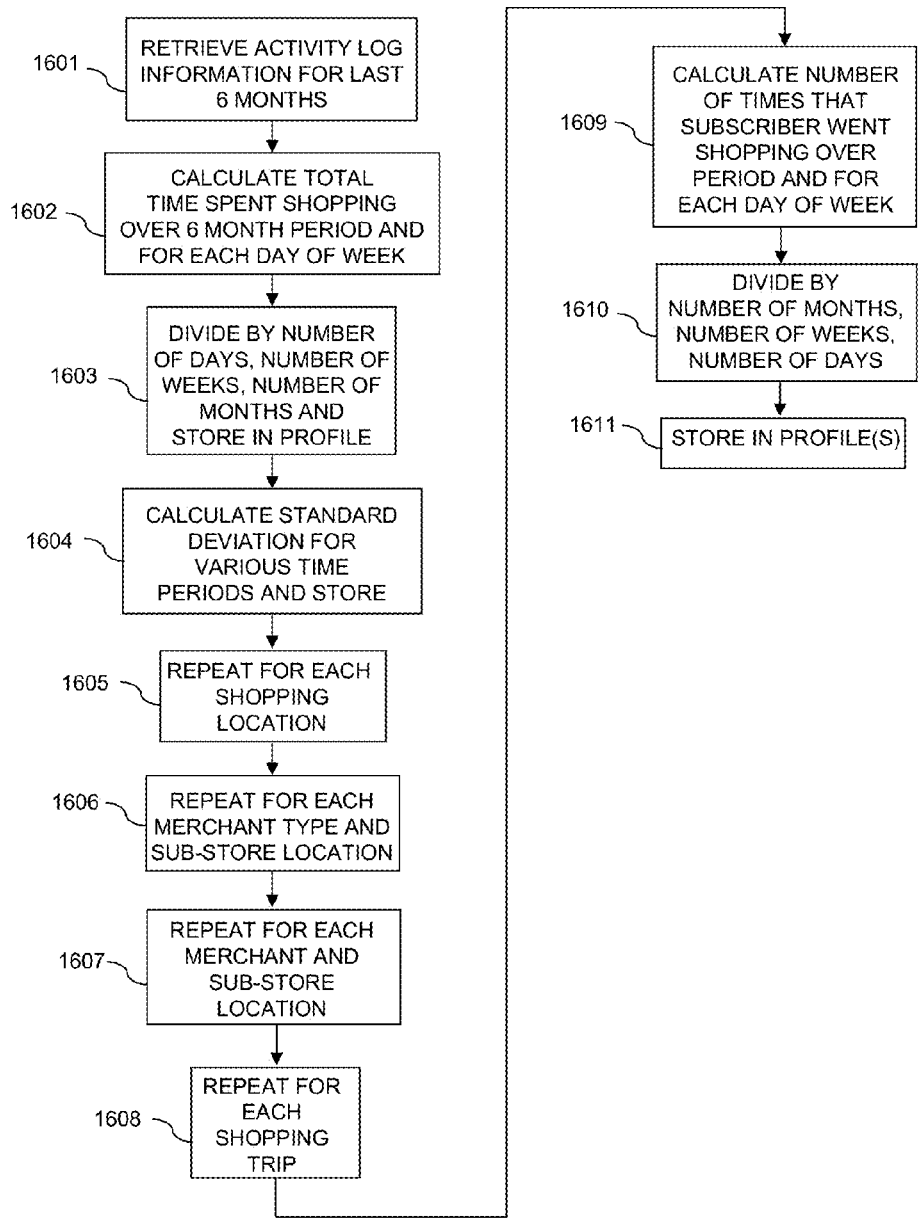

FIG. 16 depicts a flowchart for processing shopping activity information for a respective subscriber to generate profile information according to one representative embodiment. In 1601, activity log information is retrieved for last 6 months (or any other suitable period of time). In 1602, the total amount of time spent shopping over the selected period of time is calculated. Also, the total amount of time for the selected period for each day of the week is also calculated. In 1603, the calculated values are divided by the numbers of each day of the week, number of weeks, number of months in the selected period of time and the resulting values are stored in one or more profiles to generate the average amounts of time spent shopping per day of week, per week, and per month. In 1604, the standard deviations for the various time periods are calculated and stored in one or more profiles.

In 1605, the calculation of averages and standard deviations for the time is repeated for a plurality of shopping locations or respective retail locations in which multiple merchants are present. The calculated values are stored in one or more profile(s). In 1606, the calculation of averages and standard deviations are repeated for each merchant type and sub-store location. The calculated values are stored in one or more profile(s). In 1607, the calculation of averages and standard deviations are repeated for each merchant and sub-store location. The calculated values are stored in one or more profile(s).

In 1606, the calculation of averages and standard deviations is repeated for each discrete shopping trip. That is, an individual shopping trip refers to a period of time where a subscriber was substantially continuously engaged in a shopping activity. The average amounts of time spent shopping per shopping trip per each day of week, per week, and per month are calculated and the standard deviations are calculated.

In 1607, the numbers of times that the subscriber went shopping over the selected period and for each day of week over the selected period are calculated. In 1608, the calculated values are divided by the number of months, the number of weeks, the number of each day of the week in the selected period of time and the resulting values are stored in one or more store in one or more profiles.

FIG. 17 depicts a flowchart for processing financial activity information for a respective subscriber to generate profile information according to one representative embodiment. In 1701, transaction information is retrieved for last 6 months or any other suitable period of time. In 1702, the total numbers of purchases for each day of week and total number of purchases are calculated. In 1703, the total dollar amounts of purchases are calculated for each day of the week and total dollar amount of purchases over the selected period of time are calculated. In 1704, the calculated values (from 1702 and 1703) are divided by the numbers of each day of the week, the number of weeks, and the number of months within the selected period to calculate the average values to be stored in the one or more profile(s). In 1705, the standard deviations for respective time periods are calculated and stored in one or more profiles.

In 1706, the calculations are repeated to calculate the averages and standard deviations for the various time periods for each shopping trip. The calculated values are stored in one or more profile(s). In 1707, the calculations are repeated for each shopping location. The calculated values are stored in one or more profile(s). In 1708, the calculations are repeated for each merchant type. In 1709, the calculations are repeated for each merchant. The calculated values are stored in one or more profile(s).

Figure 18:
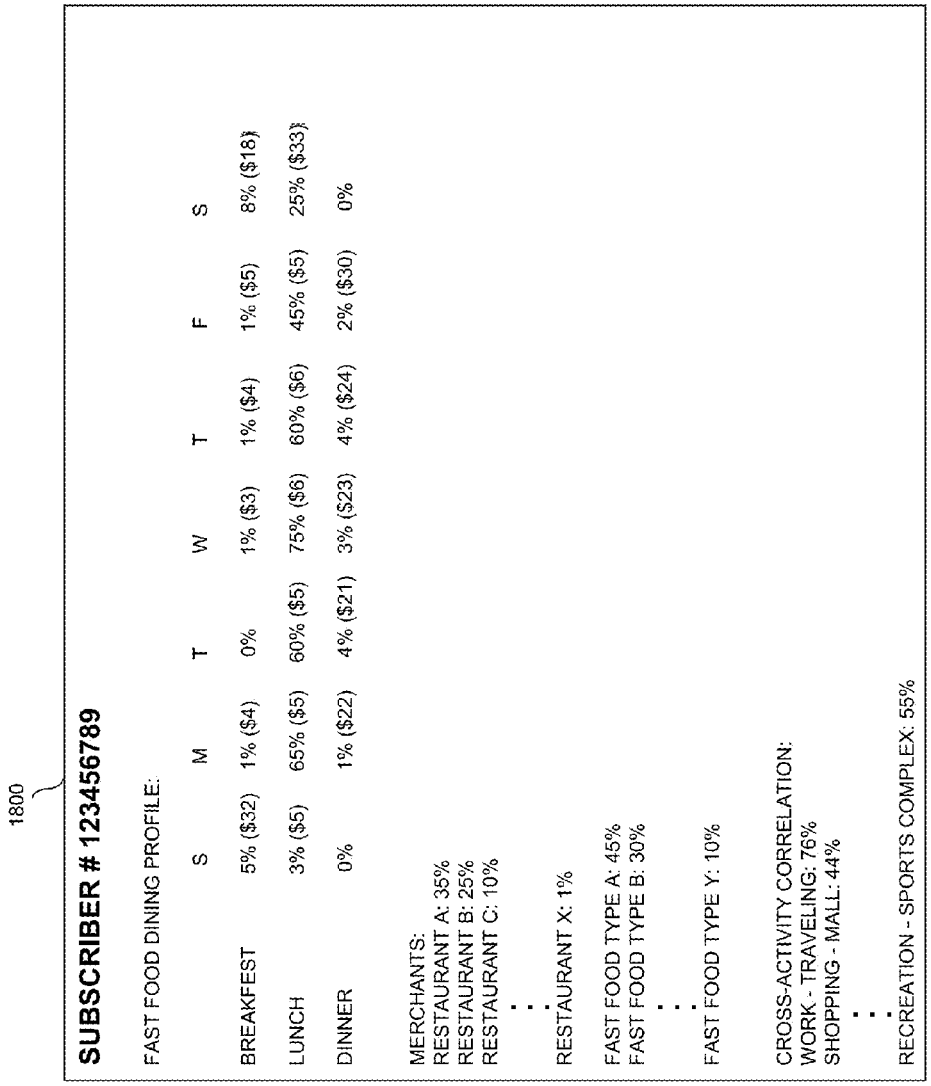

FIGS. 18 and 19 depict example activity norm profiles 1800 and 1900 for different types of merchants according to some representative embodiments. Norm profiles 1800 and 1900 are preferably compiled by monitoring activity information as determined using LBS data and financial information for the respective subscriber. Any number of similar profiles can be defined for other types of shopping or spending activities. Preferably, some profiles are created and maintained for each subscriber, although not every profile need be created and maintained for each subscriber as some subscribers may not sufficiently engage in the respective activity for the information to be useful.

Norm profile 1800 depicts activity norm data for "FAST FOOD DINING." Norm profile 1800 depicts the percentage of times that the subscriber engages in the activity at the respective times (by breakfast, lunch, and dinner) for each day of the week and the average amount spent at each respective time when the subscriber decides to engage in the activity. It may be observed that at certain times the subscriber dines with other parties, such as members of the subscriber's family, while at other times the subscriber dines alone (compare breakfast on Sunday with lunch on Wednesday). Profile 1800 further details percentages of purchases by restaurants and restaurants types. For example, profile 1800 indicates that the subscriber dines at restaurant A 35% of time when the subscriber decides to engage in fast food dining Profile 1800 further indicates that the subscriber dines at a restaurant of type A 45% of the time when the subscriber decides to engage in fast food dining.

Norm profile 1800 preferably indicates other activities that are correlated to fast food dining For example, norm profile 1800 indicates that when the subscriber is engaged in a "work—traveling" activity, the subscriber engages in fast food dining 76% of the time (during or shortly thereafter the work-traveling activity). Also, norm profile 1800 indicates that when the subscriber is or recently has engaging in a "shopping mall" activity, the subscriber engages in fast food dining 44% of the time (during or shortly thereafter the shopping mall activity). By providing such correlation information, specific ads can be directed to a subscriber at an appropriate time. Specifically, the ads might be able to reach the subscriber before the subscriber has made a decision to engage in a specific activity or to go to a specific merchant. That is, if only current location data is utilized, "fast food dining" ads might not be selected. Accordingly, the subscriber may make a decision to engage at a specific fast food restaurant before ads are ever communicated to the subscriber. Some embodiments potentially enable ads to be communicated to the subscriber at a relevant time but before the subscribers has made such a decision. Thereby, the "steering" ability of communicated ads according to some embodiments may be relatively high.

Norm profile 1900 is similar to norm profile 1800 except that norm profile 1900 includes norm parameters relevant to clothing shopping, clothing merchants, and clothing merchant types (e.g., young-women's retailer, designer retailer, discount retailer, etc.). Profile 1900 includes additional information. For example, norm profile 1900 preferably includes a parameter that indicates that the number of clothing-related purchases that the subscriber typically makes per shopping trip. Norm profile 1900 may also include information indicative of the typical goods or type of goods purchased by the subscriber (e.g., if the information is made available by the retailers in connection with coupon, discount, or payment settlement processes).

Profile 1900 also preferably includes information that relates a correlation between other financial considerations and the purchase of clothing. Profile 1900 indicates that there is an increased probability of 50% of clothing purchases immediately after deposits into a financial account of the subscriber (e.g., when a paycheck or other funds are deposited in the account). Also, there is an increase in the average amount of said purchases immediately after deposits of 70%. It is seen, for this subscriber, that clothing purchases are highly correlated to available funds and, accordingly, the selection of ads for this subscriber should also depend upon the deposit of funds into the subscribers account (e.g., in terms of timing of the deposits and the amounts of the deposits).

Profile 1900 indicates decreased probability of 20% immediately after out of budget expenses. Profile 1900 further indicates a decreased average amount of purchase immediately after out of budget expenses of 50%. In general, expenses may be categorized by analyzing the financial activity of a subscriber to assign expenses/payments to various categories. See APPENDIX A of PCT Publication WO 2008/082794 A2. Significant deviations (e.g., greater than 20%, 30%, . . . 50%, or any suitable dollar amount) from typical expenses for a significant budget category may indicate that the subscriber is currently experiencing financial difficulty or unexpected expenses. For some subscribers, such unexpected expenses may cause the subscribers to curtail certain other purchases. By correlating such unexpected expenses to purchasing behavior, subscriber reaction to subsequent unexpected expenses may be predicted and ad selection modified in response thereto. Accordingly, such information can be obtained and stored in subscriber profiles according to some representative embodiments for the purpose of ad selection for subscribers.

FIG. 20 depicts activity norm analysis that cross-correlates selected financial transaction behavior to other subscriber behavior. In 2001, deviations in typical expenditures (e.g., deviations exceeding 10%, 20%, 30%, and 40% of typical discretionary or other spending) are identified. Such deviations may be performed to identify unexpected expenses or significant purchases that may impact other purchasing decisions of the subscriber. In 2002, changes in purchasing behavior after identified deviations are identified for multiple shopping / spending categories in terms of probabilities of purchases and amounts of purchases. In 2003, changes in probabilities and amounts of purchases are stored in profiles for the various identified deviations (if any). In 2004, changes in purchasing behavior after deposits into subscriber account(s) in terms of probabilities of purchases and amounts of purchases are analyzed In 2005, changes in probabilities and amounts of purchases are stored in profiles for various deviations. In 2006, changes in purchasing behavior in relation to variation in amounts of deposits into subscriber account(s) in terms of probabilities of purchases and amounts of purchases are analyzed. In 2007, changes in probabilities and amounts of purchases are stored in profiles for various deviations.

Figure 21:
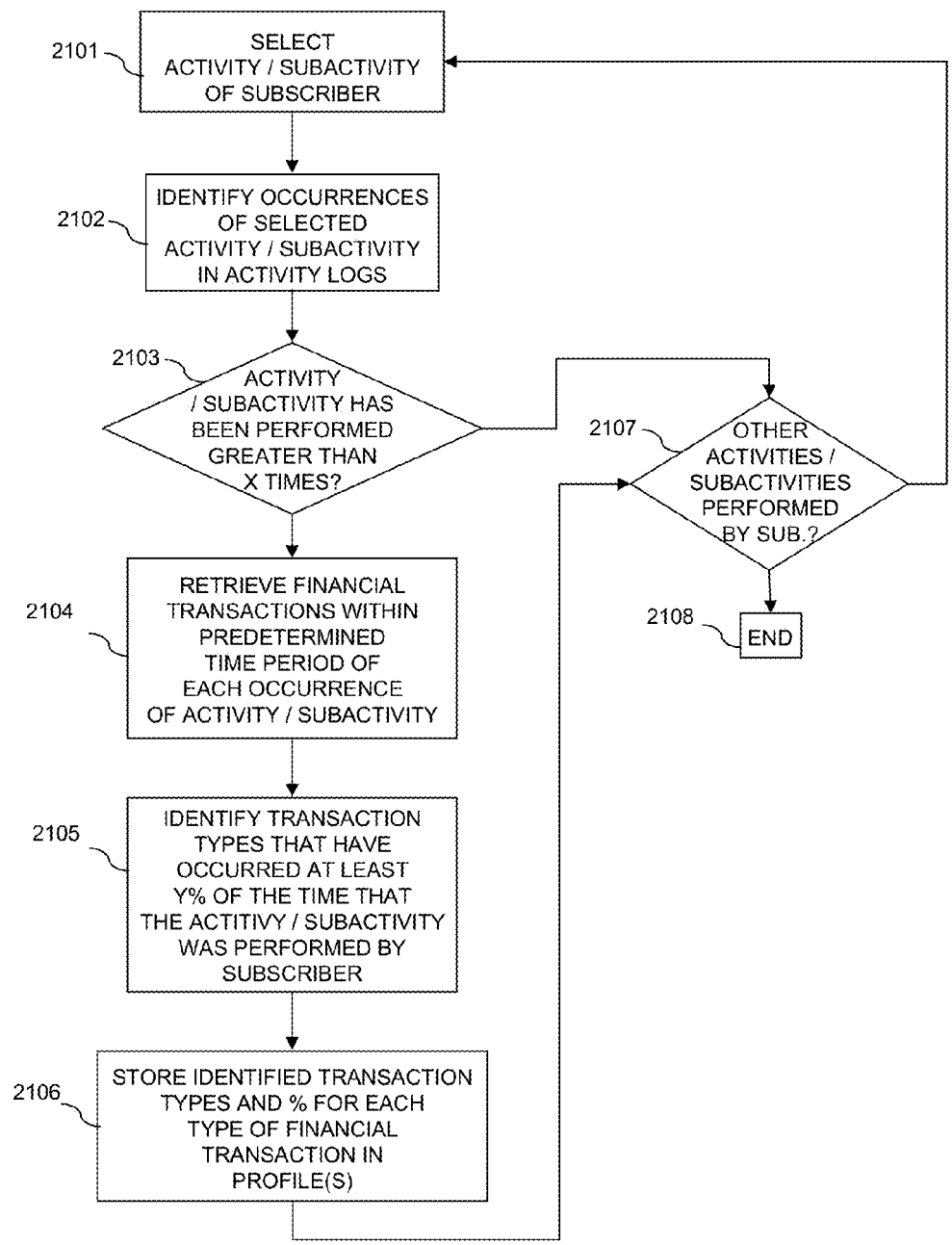
FIG. 21 depicts activity norm analysis that cross-correlates selected activities and/or sub-activities to financial transactions according to one representative embodiment.

FIG. 21 depicts a flowchart to identify correlations between purchasing behavior of a subscriber and various activities performed by the subscriber according to one representative embodiment. In 2101, an activity and/or subactivity of subscriber is selected for analysis. In 2102, occurrences of selected activity/subactivity in activity logs for a suitable time period (e.g., six months) are identified. In 2103, a logical comparison is made to determine whether the selected activity/subactivity has been performed greater than x number of times within the period of time. If so, the process flow proceeds to 2104. If not, the process flow proceeds to 2107.

In 2104, financial transactions within predetermined time period of each occurrence of activity/subactivity are retrieved (e.g., within one, two, or three hours, for example). In 2105, transaction types that have occurred at least y % of the time that the activity/subactivity was performed by subscriber are identified (e.g., clothing purchases, payments for dining, payments for various forms of entertainment, etc.). A suitable percentage of the time may be 50% according to one embodiment (although any other suitable percentage could be employed for other embodiments). In 2106, identified transaction types and % for each type of financial transaction are stored in one or more profile(s).

In 2107, a logical comparison is made to determine whether other activities/subactivities have been performed by the subscriber within the last six months or other selected time period. If so, the process flow returns to 2101 for selection of another activity/subactivity. If not, the process flow ends at 2108.

In some embodiments, the information stored in DB 107 is utilized to analyze and detect the collective activities of subscribers. In some embodiments, "clustering" of subscriber activity is detected. As used in this application, clustering refers to multiple subscribers engaging in a common activity or activities within the relatively same geographical location. Clustering of such individuals could be detected over time by repeatedly observing the close proximity in the locations of such individuals. That is, because the same subscribers are observed in very close physical proximity on multiple occasions, some type of relationship is believed to exist between such subscribers. Specifically, their repeated presence together is not a mere accident. Alternatively, the relationship between such subscribers could be known using a priori information (e.g., as provided by one or several of the subscribers when opening an account with some web or other application, as defined by a social networking application, etc.). It shall be appreciated that clustering is not limited to any particular type of relationship. Clustering may occur in many contexts, e.g., family activities, gatherings of friends, business meetings, etc.

Clustering provides valuable insight into the expected behavior of subscribers and especially commercial behavior. Thus, the detection of clustering provides a valuable mechanism to direct various types of advertising to such subscribers. The advertising may take the form of direct ads sent to wireless devices of the subscribers, e-mail advertisements, web page advertisements, etc. The communication of ads may occur while the clustering is taking place or may occur at a later time. The communication may occur before the clustering takes place. That is, it may be possible to predict a clustering event (e.g., the specific subscribers have been observed to cluster at the same approximate time/day, etc.) based on prior subscriber behavior. In such a case, delivery of the ads may occur immediately before the estimated time of the predicted clustering event as an example.

As an example, a family may decide to go to a mall on a weekend day. It is quite common for multiple members of the family to possess their own cellular phones. Perhaps, each parent and each teenager in the family would possess their own cellular phone or other wireless device. Assuming that each family members' wireless device possesses a suitable LBS application that reports the respective subscriber's location to an LBS application or LBS gateway, the clustering of the family members can be detected. For example, when the family members initially enter the mall, the family members' respective GPS data may be very similar. That is, the LBS applications of their wireless devices may report substantially similar location information. Also, as each family member enters the mall, the GPS reception may fade at substantially the same time (which can be communicated to an LBS application or gateway). Using such close GPS or other location information, their very close proximity to each other can be detected thereby indicating that a clustering event is occurring. Each member of the family may not necessarily be within very close proximity for the entire expedition to the mall. However, during the common activity, the activities of the family members will most likely be inter-dependent in many ways even though the members are not necessarily in very close proximity the entire time.

For example, the family members may initially separate to frequent each family member's favorite stores. However, the family members may gather back together to eat lunch or dinner together. Also, the purchases of the family members may be quite different when the family members are together as opposed to when the family members go shopping individually. For example, when a family is found to be clustering, purchasing may be skewed towards the children or teenagers of the family. If the parents are found to cluster without the children, a different set of purchasing behavior could be expected. Likewise, if each individual were determined to be shopping alone, the purchasing behavior again may be different. Further, shopping in the context of peers or friends can exhibit another set of purchasing norms. Additionally, the individual making the purchases may be different depending upon the presence of other individuals. For example, a parent may decide to go to a particular establishment for a meal for the family which would not be chosen by any individual on their own. Hence, in such a situation, the type of ads for meals should depend upon whether the clustering is taking place and the members of the current cluster. Also, it would be beneficial to identify the party that is most likely to make the purchasing decision.

Figure 3:
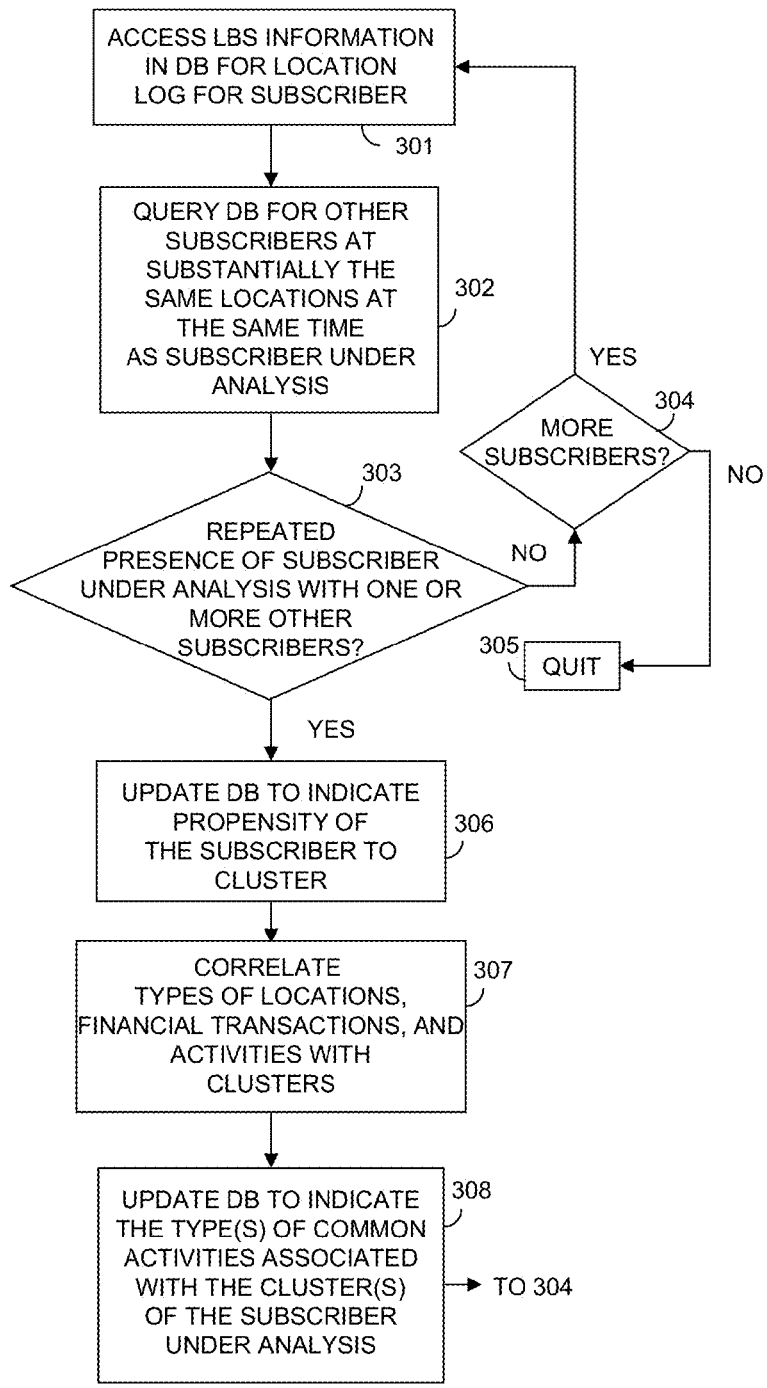
FIG. 3 depicts a flowchart for identifying clustering according to one representative embodiment.

FIG. 3 depicts a flowchart according to one representative embodiment. In step 301, LBS information is accessed from one or several databases for prior locations of a selected subscriber as logged in the database(s). In step 302, the database(s) is/are queried for other subscribers that were present at substantially the same location as the selected subscriber at substantially the same time. In step 303, a logical comparison is made to determine whether there are one or more subscribers that were repeatedly present at the same location as the selected subscriber.

If not, the selected subscriber has not been observed to exhibit clustering behavior and the process flow proceeds to step 304 where another logical determination is made. In step 304, it is determined whether there are additional subscribers to analyze. If not, the process flow proceeds to step 305 to quit. If there are, the process flow returns to step 301 to select another subscriber.

If the logical comparison of step 303 determines that there are one or more subscribers that were repeatedly present at the same location as the selected subscriber, the process flow proceeds from step 303 to step 306. In step 306, a suitable database update is completed to indicate that the selected subscriber exhibits clustering activity. The database update may include indicating the identifiers of other subscribers with which the subscriber tends to cluster.

In step 307, the activities, associated financial transactions, etc. associated with the common locations are identified for the selected subscriber are identified. In step 308, one or more databases are updated to indicate the type(s) of locations, type(s) of common activities and transaction data associated with the selected subscriber's clusters. The process flow proceeds from step 308 to step 304 to determine whether there are additional subscribers for the cluster analysis process.

FIG. 4 depicts a flowchart for processing cluster data according to one representative embodiment. In step 401, a cluster of subscribers (multiple subscribers that have been repeated observed within close proximity of each other) is selected (e.g., as identified in one or more databases). In step 402, activity information and financial information (e.g., transaction details) for subscribers in the cluster are retrieved.

In step 403, the transactions by individuals in the cluster are categorized (if not already so processed). In step 404, the member(s) of the cluster that are likely to pay for various transactions during clustering are determined. In step 405, the types of goods and/or services that exhibit an increased or decreased probability of purchase are determined for the subscribers of the cluster. In step 406, the types of goods and/or services that exhibit a change in probability when the individuals are not clustering are identified. In step 407, the types of goods that exhibit a change in probability before and after clustering are determined for the subscribers of the cluster. In step 408, the activities that exhibit a change in probability (increase or decrease) in conjunction with the clustering are identified.

In step 409, the information pertaining to the clustering is stored in a suitable database or databases.

FIG. 5 depicts a flowchart for utilizing cluster information according to one representative embodiment. In step 501, a request (e.g., an HTTP transaction to a suitable LBS advertising web server application) is received from an LBS advertiser.

In step 502, a suitable web page is provided to the LBS advertiser that preferably includes interactive elements to enable the LBS advertiser to view subscriber information and to direct advertisements to suitable subscribers. In step 503, cluster information is included within the subscriber information for provision to the LBS advertiser. For example, the LBS subscriber may be allowed to click on a graphical element within the web page that represents a given subscriber.

In response, subscriber information may be presented (e.g., an activity log, transaction information, activity norms, financial transaction norms, etc.). Within such information, preferably the LBS advertiser is provided information that indicates whether the subscriber is current "clustering" and, if so, with which other subscribers. The nature of the clustering is preferably identified (e.g., family clustering, peer clustering, business clustering, etc.). Also, information that identifies the types of transactions or activities that exhibit increased or decreased probability are preferably provided. By providing such information, the LBS advertiser can more effectively identify desirable subscribers for ads and/or selected more appropriate ads for the subscribers.

FIG. 6 depicts another flowchart for utilizing cluster information according to one representative embodiment. In step 601, advertising parameters are received (which may include one or more clustering parameter values). The advertising parameters define the desired recipients of one or more directed advertisements (e.g., as will be delivered to subscriber wireless devices). For example, the following tag-encoded parameters could be used as part of a desired LBS advertising effort to direct advertisements to subscribers: {<LOCATION>STONEBRIAR MALL</LOCATION> AND <CLUSTERING>TRUE </CLUSTERING> AND (<CLUSTERINGWITHFAMILY>TRUE </CLUSTERINGWITHFAMILY} OR <CLUSTERINGWITHFRIENDS>TRUE </CLUSTERINGWITHFRIENDS>) AND (<CLUSTERINGPURCHASER>MEAL </CLUSTERINGPURCHASER>}. In this case, the ads would be directed to subscribers located within or proximate to "Stonebriar Mall." Also, the subscribers would be required to be clustering before the advertisement(s) associated with these parameters would be delivered. Also, the subscribers would be required to be clustering with family members or friends (as opposed to business purpose clustering). Also, each advertising target would be required by these parameters to be a subscriber within the respective cluster that tends to pay for meals during the clustering of the respective subscribers.

In step 602, ads are communicated by a suitable LBS advertising platform to subscribers according to the received parameters. The direction of the ads may directly depend upon the defined clustering parameters/data provided in the received parameters. For example, an advertiser may direct that advertisements are only to be sent to members of a cluster that make purchasing decisions for meals among other advertising parameters in addition to providing non-clustering advertising parameters. The ad parameters may be defined in terms of any of the clustering information discussed herein or any other suitable clustering information. Alternatively, the advertiser may provide more general advertising parameters and automated subscriber selection algorithms can select the most probable subscribers to respond based upon the clustering information.

Social network applications commonly refer to applications that facilitate interaction of individuals through various websites or other Internet-based distribution of content. Originally, the concept of a social network originated within the field of sociology as method of modeling social interactions or relationships. Within such modeling, individuals, groups, or organizations are represented as nodes within a social network and the relationships between the "nodes" are represented as links between the nodes thereby forming a "network."

Some known social network applications have (directly or indirectly) utilized such concepts to facilitate interaction between individuals via the Internet. In most social network applications, a specific user can create an account and provide various types of content specific to the individual, such as pictures of the individual, their friends, their family, etc., personal information in text form, favorite music or videos, etc. The content is then made available to other users of the social network application. For example, one or more web pages may be defined for each user of the social network application that can be viewed by other users of the social network application. Also, social network applications typically allow a user to define a set of "friends, contacts," or "members" with whom the respective user wishes to repeatedly communicate. Users of a social network application may post comments or other content to portions of each other's web pages.

For the purpose of this application, a social network application refers to any application or system (with communication over wired and/or wireless networks) in which users are permitted to create or define accounts in which the users can make personalized information and content available for viewing by other users of the social network application and, in which, users can define, allow, or create contacts or friends within the social network application in which repeated interaction is intended to occur through the social network application. As used herein, an "account" of a social network application refers to the collection of data maintained for a respective user for interaction with the social network application and other users of the social network application whether stored together or separately. The collection of data may include user id, password, screen name, email address, wireless device info., name information, demographic information, likes/dislikes, photos, activities, relationships, etc.

Some representative embodiments differ from certain previously known social network applications. Some representative embodiments preferably provide functionality that enables users of a social network application to interact with other users or "friends" in unique ways. In some embodiments, users may interact with a mobile or mobile application on a smartphone of the user to indicate their "current place" for communication to other users or friends. Also, users may leave comments for other users for such places for presentation to their friends and users (e.g., via their smartphones). As used herein, the term "mobile application" refers to an application on a mobile or wireless, subscriber device which conducts network communication using the wireless functionality of the subscriber device. Some representative embodiments further provide functionality in a wireless phone to enable a user to upload data and/or images to the account of the user in an efficient manner for presentation to other users.

Some representative embodiments further enable users to indicate items to which the users have affinity or "like" via a "like function." In yet further embodiments, the social network application includes location based service functionality as discussed herein. For example, activities of users of the social network application may be logged and employed to direct ads to users of the social network application (e.g., via a mobile application or other software on a given user's smartphone).

Figure 22:
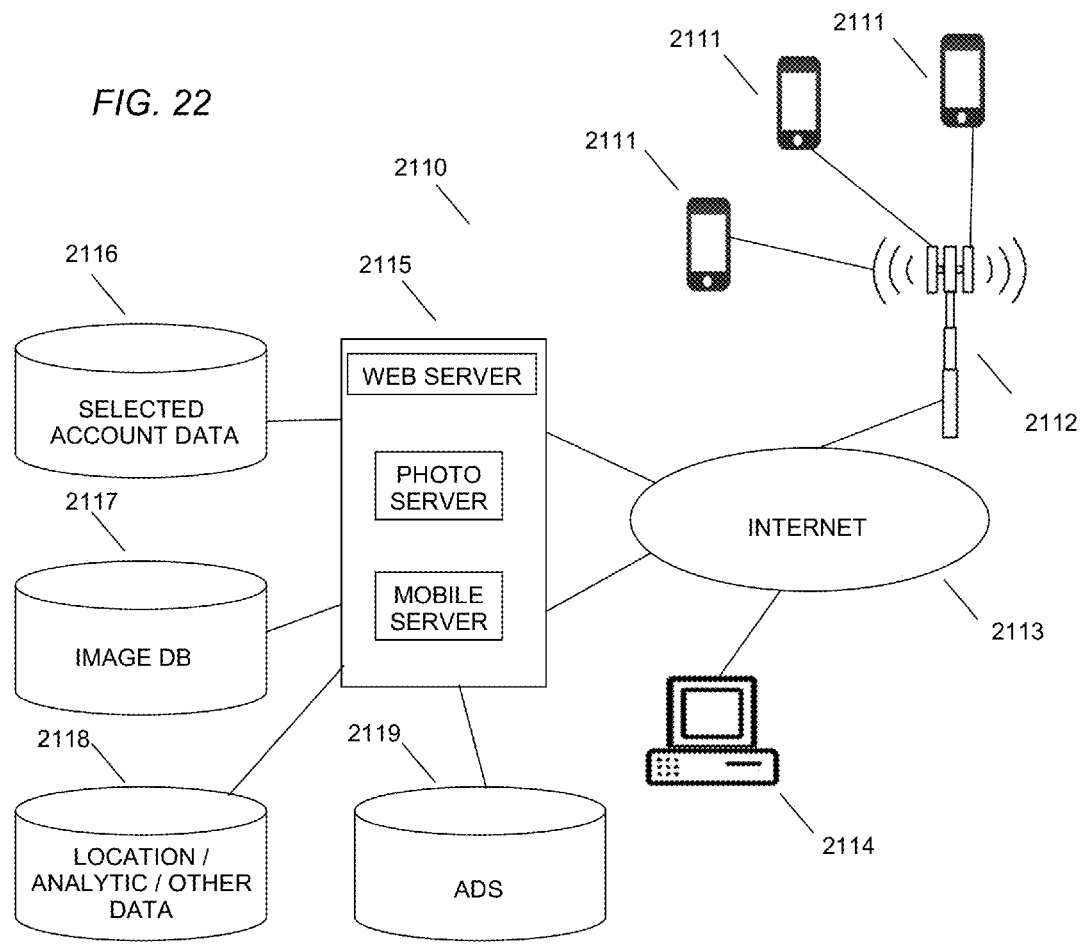
FIG. 22 depicts a system for supporting a social network application according to one representative embodiment.

Referring to system 2110 as shown FIG. 22, some embodiments may conduct various social network application operations. Such operations may include operating at least one social network application server 2115 for interacting with users of the social network application. The software on server(s) 2115 may include a web server for serving pages of the social network application, e.g., HTML pages via HTTP protocols via Internet 2113. Users on computers 2114 may access their accounts, uploaded data, communicate with friends, view other user web pages on the social network application, etc.

In one embodiment, photo server is provided for direct uploading of photos to the social network application. Also, a mobile server may be provided for facilitating interaction with wireless, telephony subscriber devices 2111. The software on the application server may maintain selected user account data (in database or other data store 2116) for users of the social network application, where the user accounts include data defining relationships between users of the social network application. The relationships may be referred to as "friends" providing a link between respective users of the social network application. Such friends or users may have privileged status to view certain content posted to the account of another user. The content may include photos (e.g., as stored in image DB 2117).

Preferably, at least some of the users of the social network application are users of wireless, telephony subscriber devices 2111 (which communicate, at least partially, through wireless infrastructure 2112 of a public, telephony network). Devices 2111 may also include other wireless communication functionality (e.g., Wi-Fi or similar wireless functionality). The social network application may provide software to operate on wireless, telephony subscriber devices. The software may be in the form of browser-executable code or may be an application for installation and execution on the wireless, telephony subscriber device.

Figure 23:
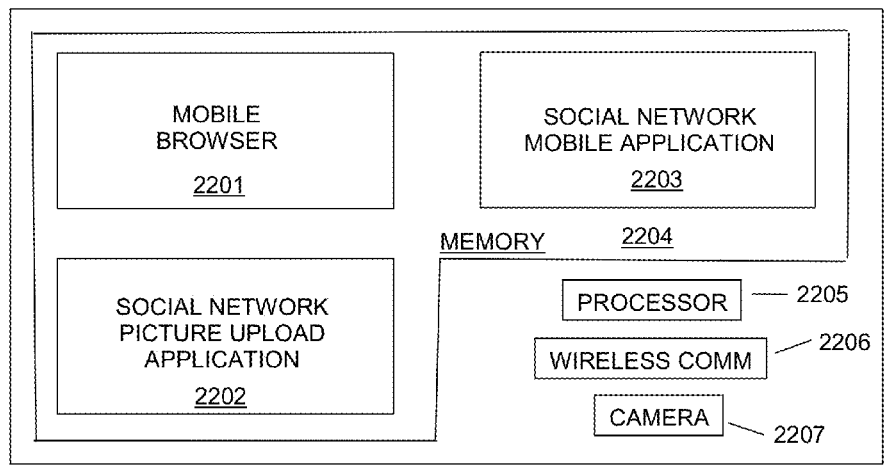
FIG. 23 depicts a wireless, telephony subscriber device according to one representative embodiment.

FIG. 23 depicts telephony device 2111 according to one representative embodiment. Device 2111 may include conventional components such as processor 2205, wireless communication circuitry 2206, camera 2207, etc. Device 2111 may include memory 2204 for storing data and software. The software may include mobile browser 2201, social network mobile application 2203, and social network application picture upload application 2202 according to some embodiments. Any other suitable software may be included including software for communicating location data and/or device use data and software for receiving ads.

In some embodiments, a "like-function" is provided by the social network application. The like-function is a function whereby a user of the social network application may input data, which is defined within the social network application and commonly understood by the users of the social network application, to indicate approval of or affinity with a defined item. That is, the user may input data via a user interface (e.g., on a smartphone app or via a web page on a smartphone or computer) to indicate such approval or affinity and the data is stored in the account of the user. The inputted data from the like-function may then be shared with friends of the given user or other users. The communication of "like-function" data to friends may be communicated to friends based upon access control limits (e.g., all social network users, friends only, selected friends only, etc.).

The like-function may be implemented in any suitable form. For example, a simple boolean graphical user input (e.g., a radio button, a select button, etc.) may be provided for the user to indicate the user's affinity or approval. Alternatively, more complex user interface element may be additionally or alternatively employed, e.g., a text input box for specific comments. For commercial items, the like-function data may be indicative of an item that the user is currently contemplating buying, the types of stores that the user is willing to purchase from, the price range of products that the user contemplates is appropriate for the goods of interest, etc. Any such suitable like-function data may be gathered in accordance with some embodiments.

In some embodiments, the like-function is combined with location data (e.g., as obtained by the smartphone of the respective user) to specify the location of the item identified by the user via the like-function. The like-function data may also be communicated in a location dependent manner, e.g., when selected friends are present at or arrive at a location near or proximate to the location where the originating user identified the item of interest.

Also, ads (e.g., as stored in ad DB 2119) may be selected based upon items identified via the like-function and any other social network application data discussed herein. The ads may also be communicated in a location dependent manner. Any of selection algorithms discussed herein may be employed for direction of ads to users of the social network application according to ad selection criteria for comparison against location, analytic, and/or other data as stored in DB 2118 as an example. Any suitable ad selection and distribution infrastructure may be employed. For example, the multiple application infrastructure discussed herein may also be employed according to some embodiments.

Figure 25:
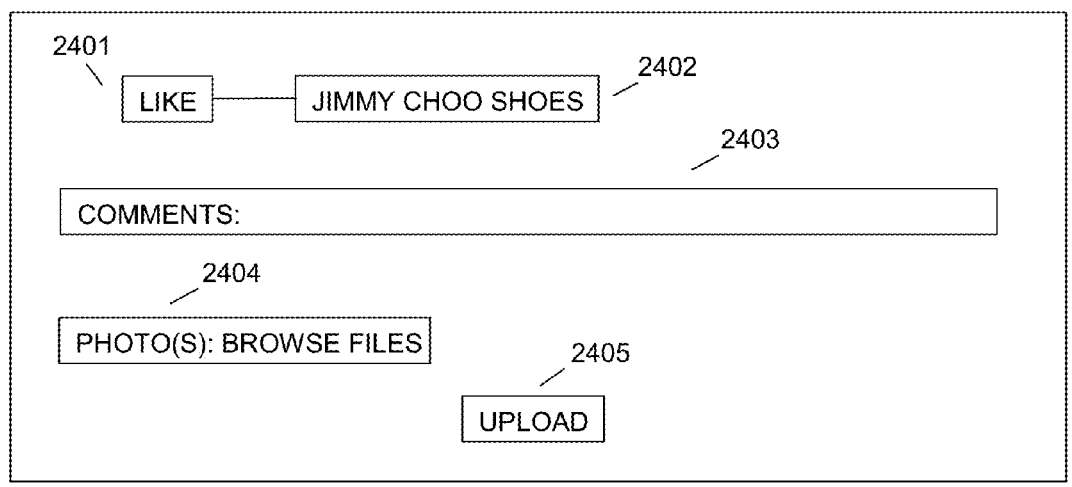
FIG. 25 depicts a user interface for use in a social network application according to one representative embodiment.

FIG. 25 depicts a user interface that may be provided by suitable software on a wireless device 2111 (e.g., by mobile browser 2201 when it is executing suitable browser executable code or application 2203). The interface includes a button for the user to select to indicate affinity or approval of the defined item 2402. The defined item may be input directly by the user via text entry. Alternatively, the defined item may be pre-defined for selection by the user. The user may input appropriate comments in text control 2403. In other embodiments, the user may also upload photos using control 2404. Control 2404 enables the user to browse files and file directories for selection of one or more photos for the upload process. Button control 2405 enables the user to upload the photo(s) and data defined by the various controls.

In some embodiments, the social network application includes functionality to enable interaction and/or communication between users of the social network application in relation to defined locations or "places." In some embodiments, mobile app software is provided (e.g., via downloading and/or installation) for operation on the wireless, telephony subscriber devices. The mobile app software is intended for interacting with the social network application to access user accounts of the social network application. For example, the mobile app software may enable a user to view the profile pages of the friends of the user and the profile pages of other users (as permitted by access control data).

The mobile app software is preferably further adapted to enable a user of the wireless, telephony subscriber device to "check in" at respective locations from a plurality of locations. A "check in" refers to an operation that is performed via the social network application (e.g., through the mobile app software) to permit the user to indicate through the social network application the current whereabouts of the user. This location may be displayed on the user's profile page, be communicated on a map interface provided by the social network application, or may be communicated directly to the wireless, telephony subscriber devices of friends. The communication may occur in substantially real-time as the performance of the check-in operation in certain embodiments.

In some embodiments, the check-in operation may identify a location from a plurality of locations that are defined in the social network application and, preferably, includes places of business. The plurality of locations may include user defined locations as directly input via the software on subscriber devices.

In some embodiments, the mobile app software provides selections for the user to control visibility of the user's current location (and/or related content) to other users of the social network including friends of the user and customizable lesser subsets of all friends of the user. The user may select specific friends from a list to permit (or prohibit) viewing of the user's current location and location-content. Pre-defined groups or lists of friends may be defined for selection for this purpose.

In some embodiments, the mobile app software provides input capabilities to receive one or more comments to be automatically posted to the account of the user, the one or more comments being specifically tied to respective locations identified by functionality of the wireless, telephony subscriber device such that friends of the user as selectively permitted by the user are able to view the one or more comments of the user on a map interface at the respective identified locations in substantially real-time as the user who posted the one or more comments is at the respective location.

In some embodiments, the number of check-ins are counted for specific merchants for users of the social network application. Incentive offers are then communicated depending upon the specific number of check-in operations performed by respective users. In this manner, users of the social network may be rewarded for loyalty to specific merchants and for participating in the check-in functionality of the social network application.

Also as discussed herein in regard to operations of apps and wireless, telephony subscriber devices, activities of users of the wireless, telephony subscriber devices are preferably logged (e.g., as stored in DB 2118 and/or DB 2116 in FIG. 22) where the logged activities include device use, app use, and even real-world activities as discussed herein. These activities may be inferred from location data and/or device use data. Alternatively, an individual user may explicitly input data to indicate the current activity of the user. The activities may be presented for review by other users and/or may also be employed to select advertisements for users of the social network application.

Figure 24:
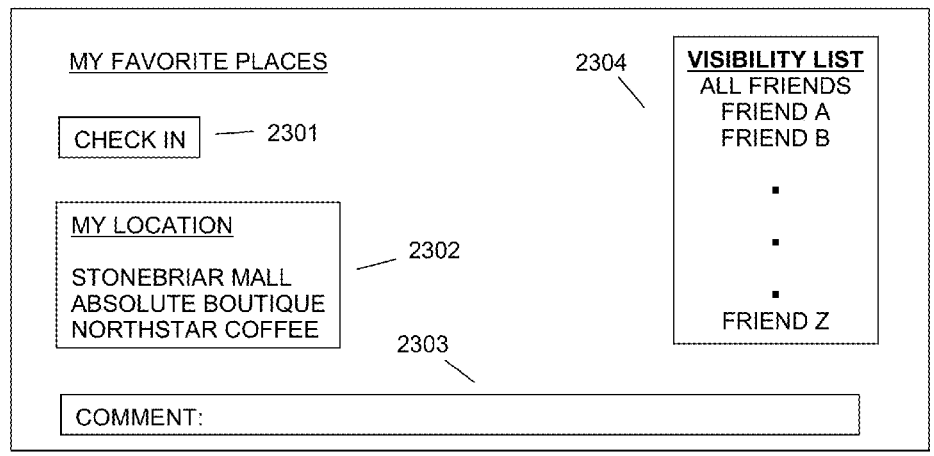
FIG. 24 depicts a user interface for use in a social network application according to one representative embodiment.

FIG. 24 depicts a user interface that may be provided by suitable software on a wireless device 2111 (e.g., by mobile browser 2201 when it is executing suitable browser executable code or application 2203). The interface includes "check in" button, that when selected, causes the software to communicate a suitable message to the social network application that identifies the current location of the user for use by the social network application. The location may be determined automatically using GPS functionality or other wireless location algorithms. Additionally or alternatively, the user may select a location from list 2302. Additionally or alternatively, the user may define a location via interface for the check in operation. The user may also enter a comment via text control 2303 to be display with the user's current location on the social network application. The visibility of the current location may be controlled using visibility list 2304 to select all users, all friends, a lesser subset of friends (e.g., a number of friends less than the full group of friends), or no visibility at all as desired by the user.

In some embodiments, the social network application is adapted to facilitate substantially real-time posting of photos to accounts (e.g., for display via profile pages) taken directly from wireless, telephony subscriber devices of users of the social network application.

In some embodiments, first mobile app software for operation on the wireless, telephony subscriber devices is provided for interacting with the social network application to access user accounts of the social network application. The first mobile app software may be browser executable code (e.g., an HTML variant) or a mobile application. Second mobile app software (e.g., software 2202 in FIG. 23) for operation on the wireless, telephony subscriber devices is provided for posting photos taken by the wireless, telephony subscriber devices to user accounts of the social network application. The second mobile app software is adapted to directly interact with camera functionality of the wireless, telephony subscriber devices to transfer a captured photo to at least one social network application server (preferably with photo metadata, that is data entered via data input controls by the user of a respective wireless, telephony subscriber device).

The second mobile app software is preferably implemented to function without requiring the respective user to log into the social network application via the first mobile app software to view the user account of the respective user. That is, the user can simply take a picture using the camera functionality of the wireless, telephony subscriber device and then post or transfer the photo to the user's account without requiring the user to interact with the social network application through the conventional user account mechanisms (including navigating to the user's login page, initial web page, selection of a photo tab from the initial web page, etc.).

On the server side of the social network application, messages from the second mobile app software are automatically parsed and the photos are automatically posted to users accounts with data entered by the respective users as parsed from the messages (e.g., by photo server software of server platform(s) 2105). Preferably (but not required), the automatically parsing and automatically posting occurs through separate server functionality than provided for web page access of user accounts of the social network application. The photos and messages become available for viewing on the social network application web pages of the respective users in substantially real-time.

Figure 26:
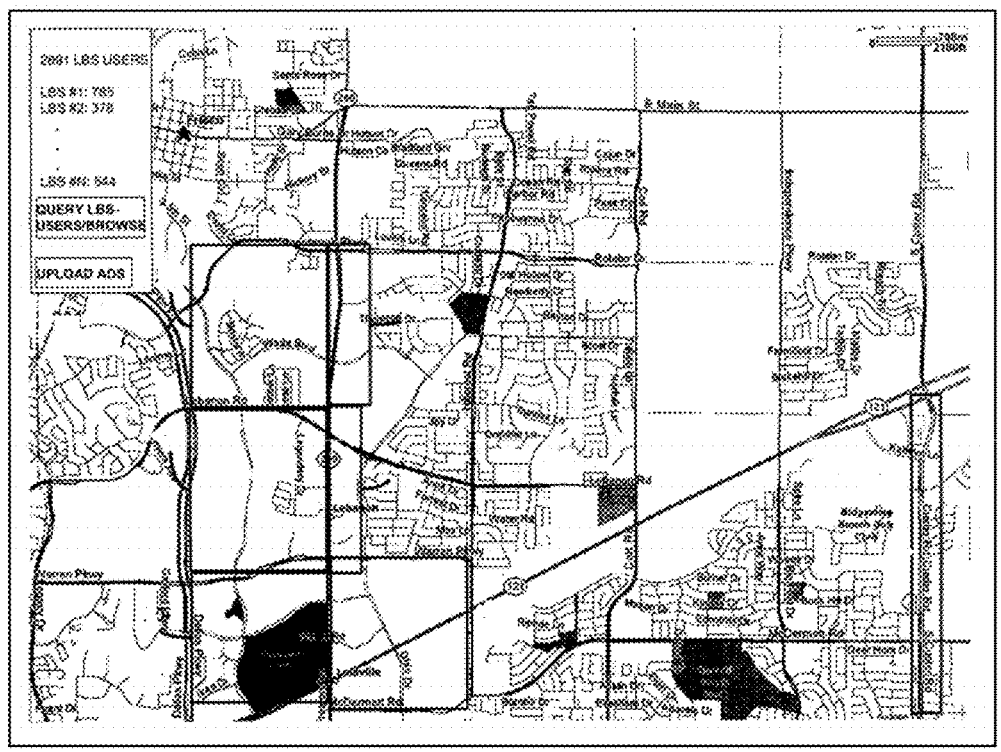
FIG. 26 depicts a map interface for displaying mobile subscriber analytics according to one representative embodiment.

In some embodiments, maps or map applications are provided in which wireless, telephony subscriber device data is presented over a map of a geographical region (see, e.g., map interface 2600 in FIG. 26). The device data may include subscriber analytic data. Alternatively, the data may include specific subscriber information. The logged activities (current and past activities) of subscribers may be presented on the maps. Also, in some embodiments, subscribers are able to identify specific areas that are excluded from data gathering according to subscriber privacy preferences.

In some embodiments, wireless device use data is received from multiple wireless, telephony subscriber devices by the at least one mobile device analytic server. The received wireless device use data is processed to generate subscriber analytic data and other data. Web queries are received from third-parties (e.g., other subscribers, advertisers, or other users). Web pages or web applications are communicated in response to the received web queries according to an internet protocol to the third-parties, including visual presentation of selected data items.

In some embodiments, each communicated web page or web application includes a display of a map of a respective geographical region and summary indications of wireless, telephony subscriber devices within the respective geographical region that are currently in use. The maps may further display the summary indications for subscribers that match subscriber or device criteria specified in the corresponding web query. Also, the web page or applications may display summary analytic data specific for different mobile applications employed on multiple, wireless telephony subscriber devices or display specific summary analytic data for different types or groups of mobile applications employed on multiple, wireless telephony subscriber devices. For example, all subscribers currently employing "gaming" applications or "social network" applications may be displayed on the map depending upon the specific supplied criteria. Trending analytics may be employed (e.g., current activity or recent activity data compared to longer-term typical or average analytic behavioral values).

When implemented in software, the various elements or components of representative embodiments are the code or software segments adapted to perform the respective tasks when executed on suitable computer hardware. The program or code segments can be stored in a machine readable medium, such as a processor readable medium. The "computer readable medium" may include any medium that can store or transfer information. Examples of the computer readable medium include an random access memory (RAM), electronic circuit, a semiconductor memory device, a ROM, a flash memory, an erasable programmable ROM (EPROM), a floppy diskette, a compact disk CD-ROM, an optical disk, a hard disk, a fiber optic medium. The code segments may be downloaded via computer networks such as the Internet, Intranet, etc.

Although representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

This application is related to (1) U.S. patent application Ser. No. 12/463,168, May 8, 2009, which is a continuation of PCT application number PCT/2007/083987, filed 7 Nov. 2007 (published as WO 2008/082794 A2) which claims priority to (i) U.S. patent application Ser. No. 11/559,438, filed 14 Nov. 2006; (ii) U.S. patent application Ser. No. 11/623, 832, filed 17 Jan. 2007; (iii) U.S. Provisional Patent Application Ser. No. 60/864,807, filed 8 Nov. 2006; and (iv) U.S. Provisional Patent Application Ser. No. 60/917,638, filed 11 May 2007 and (2) is a related to U.S. patent application Ser. No. 12/967,040 which is a continuation-in-part of U.S. patent application Ser. No. 12/767,785, filed Apr. 26, 2010 which is a continuation-in-part U.S. patent application Ser. No. 11/747,286, filed 5 Nov. 2007, which is a continuation-in-part of U.S. patent application Ser. No. 11/623,832, filed Jan. 17, 2007, which is a continuation-in-part of U.S. patent application Ser. No. 11/559,438, filed Nov. 14, 2006 (which claims the benefit of U.S. Provisional Application Ser. No. 60/736, 252, filed Nov. 14, 2005, U.S. Provisional Patent Application Ser. No. 60/759,303, filed Jan. 17, 2006 and U.S. Provisional Patent Application Ser. No. 60/773,852, filed Feb. 16, 2006); U.S. patent application Ser. No. 11/623,832 also claims the benefit of U.S. Provisional Patent Application Ser. No. 60/759,303, filed Jan. 17, 2006 and U.S. Provisional Patent Application Ser. No. 60/773,852, filed Feb. 16, 2006. All of the preceding applications are incorporated herein by reference

What is claimed is:

1. A computer-implemented method comprising:
receiving, by a social networking system, location information for a device associated with a first user of the social networking system;
associating the location information with the first user in a user profile associated with the first user of the social networking system;
sending, from the social networking system, to a second user a communication generated based at least in part on the location information;
operating at least one social network application server for interacting with users of the social networking system, wherein at least some of the users of the social networking system are users of wireless computing devices;
providing a first mobile application for interacting with the social networking system via communication with the at least one social network application server, the first mobile application providing social network application operations independent of operations of a separate browser application, wherein (i) the first mobile application is further operable to employ geolocation functions of a respective wireless device to communicate geolocation information to one or more servers of hardware and software of the social network application, (ii) the first mobile application is programmed to upload photos to a respective user account with text descriptive information manually entered by the respective user for sharing via the social network application by the respective user, and (iii) at least some entries of text descriptive information communicated from the first mobile application and received by the one or more servers of the social network application are indicative of current activities of respective users;
receiving app usage information, by one or more servers of hardware and software, from a plurality of second mobile applications of different types executing on respective wireless computing devices that is generated independently of user initiated web browsing operations, wherein (i) each of the plurality of second mobile applications includes code for installation on respective wireless computing devices for application operations on respective wireless computing devices, (ii) the plurality of second mobile applications include at least mobile gaming applications that include code for conducting gaming operations without employing a separate browser application on the respective wireless computing device for gaming operations, (iii) the plurality of second mobile applications include mobile digital content applications for accessing digital content from a respective library of digital content without employing a separate browser application on the respective wireless computing device for digital content presentation operations, (iv) the plurality of second mobile application include shopping-related mobile applications for completing shopping operations without employing a separate browser application on the respective wireless computing device for shopping operations, and (v) the second plurality of mobile applications are functionally integrated with the social networking system to share social network user activities and user activities of the second plurality of applications;
combining app usage information from the second plurality of mobile applications with social network application information, wherein the combining comprises correlating non-social network application activities to respective identities in the social networking system and wherein the app usage information from the plurality of second mobile applications includes app-specific actions or postings that differ depending on a respective mobile application or mobile application type;
generating mobile app usage analytic data, from combined app usage data, relating to aggregate mobile app usage information across at least the plurality of second mobile applications by multiple different users at multiple different locations; and
providing centralized app advertising, by one or more servers of hardware and software, for the plurality of second mobile applications, wherein the providing centralized app advertising comprises: communicating one or more web pages, by one or more servers of hardware and software, for management of mobile advertising campaigns across multiple ones of the plurality of second mobile applications by respective advertisers, wherein the one or more web pages for management of mobile advertising campaigns include presentation of recent app usage analytics and time-averaged app usage analytics.

2. The method of claim 1 wherein app usage analytic data presented by one or more web pages comprises analytic data indicative of real-world activities of respective users.

3. The method of claim 1 wherein app usage analytic data presented by one or more web pages comprises analytic data indicative of social activities of respective users.

4. The method of claim 1 wherein app usage analytic data presented by one or more web pages comprises analytic data indicative of social activities of respective users together in a group setting.

5. The method of claim 1 further comprising:
receiving ads from advertisers through one or more servers of hardware and software for interacting with advertisers for receiving ads for distribution; and
distributing the ads to users of the wireless computing devices.

6. The method of claim 1 wherein at least some of the ads are communicated to users while the users are employing respective wireless computing devices.

7. The method of claim 1 wherein communication of ads includes communicating hyperlinks to respective ads for selection by respective users.

8. The method of claim 1 wherein the providing further comprises:
providing an advertiser query function to permit advertiser browsing through analytic app usage data according to advertiser supplied app-specific parameters.

9. The method of claim 1 further comprising:
receiving bids for ads that comprise app-specific bid parameters.

10. The method of claim 1 wherein the app usage data is communicated directly by the plurality of mobile applications.

11. The method of claim 1 wherein the app usage data is received indirectly by first communication of data to respective application servers and then communication of data from the respective application servers to the one or more servers performing the receiving.

12. The method of claim 1 wherein ads for the plurality of second mobile applications are selected on a user-location dependent manner.

13. The method of claim 1 further comprising:
detecting one or more active applications of the plurality of second mobile applications for respective users.

14. A method of conducting social network operations in a social networking service, the method executed by a computer system and comprising:
  operating at least one social network application server for interacting with users of the social network application service, wherein at least some of the users of the social network application service are users of wireless computing devices;
  providing a first mobile application for interacting with the social network application service via communication with the at least one social network application server, wherein (i) the first mobile application is further operable to employ geolocation functions of a respective wireless device to communicate geolocation information to one or more servers of hardware and software of the social network application, (ii) the first mobile application is programmed to upload photos to a respective user account with text descriptive information manually entered by the respective user for posting on a webpage of the social network application for the respective user, and (iii) at least some entries of text descriptive information communicated from the first mobile application and received by the one or more servers of the social network application are indicative of current activities of respective users;
  receiving app usage information, by one or more servers of hardware and software, from a plurality of second mobile applications of different types executing on respective wireless computing devices, wherein (i) each of the plurality of second mobile applications includes code for installation on respective wireless computing devices for application operations on respective wireless computing devices, (ii) the plurality of second mobile applications include at least mobile gaming applications that include code for conducting gaming operations, (iii) the plurality of second mobile applications include mobile digital content applications, (iv) the plurality of second mobile application include shopping-related mobile applications for completing shopping operations, and (v) the second plurality of mobile applications are functionally integrated with the social network application service to share social network user activities and user activities of the second plurality of applications;
  combining app usage information from the second plurality of mobile applications with social network application information, wherein the combining comprises correlating non-social network application activities to respective identities in the social network application service; and
  generating mobile app usage analytic data, from combined app usage data, relating to aggregate mobile app usage information across at least the plurality of second mobile applications by multiple different users at multiple different locations; and
  providing centralized app advertising, by one or more servers of hardware and software, for the plurality of second mobile applications, wherein the providing centralized app advertising comprises: communicating one or more web pages, by one or more servers of hardware and software, for management of mobile advertising campaigns across multiple ones of the plurality of second mobile applications by respective advertisers, wherein the one or more web pages for management of mobile advertising campaigns include presentation of recent app usage analytics and time-averaged app usage analytics.

15. The method of claim 14 wherein the providing further comprises:
  providing an advertiser query function to permit advertiser browsing through analytic app usage data according to advertiser supplied app-specific parameters.

16. The method of claim 14 further comprising:
  receiving bids for ads that comprise app-specific bid parameters.

17. A method of conducting social network operations in a social networking service, the method executed by a computer system and comprising:
  operating at least one social network application server for interacting with users of the social network application service, wherein at least some of the users of the social network application service are users of wireless computing devices;
  providing a first mobile application for interacting with the social network application service via communication with the at least one social network application server, wherein the first mobile application is further operable to employ geolocation functions of a respective wireless device to communicate geolocation information to one or more servers of hardware and software of the social network application;
  receiving app usage information, by one or more servers of hardware and software, from a plurality of second mobile applications of different types executing on respective wireless computing devices, wherein (i) each of the plurality of second mobile applications includes code for installation on respective wireless computing devices for application operations on respective wireless computing devices, (ii) the plurality of second mobile applications include at least one user-to-user messaging application, (iii) the plurality of second mobile applications include at least one digital content application for receiving digital content including links to third-party digital content, (iv) the plurality of second mobile applications include at least one digital image sharing application, and (v) the second plurality of mobile applications are functionally integrated with the social network application service to associate application operations of the second plurality of mobile applications with user identities in the social network application service;
  combining app information from the second plurality of mobile applications with social network application information, wherein the combining comprises associating application activities of the second plurality of mobile applications with respective identities in the social network application service; and
  providing centralized mobile application advertising operations, by one or more servers of hardware and software, for multiple mobile applications in a manner that is at least partially dependent upon social network information, wherein the providing centralized app advertising comprises: communicating one or more web pages, by one or more servers of hardware and software, for management of mobile advertising campaigns across multiple mobile applications by respective advertisers, wherein the one or more web pages for management of mobile advertising campaigns include presentation of recent app usage analytics and time-averaged app usage analytics.

18. The method of claim 17 wherein the providing further comprises:
  providing an advertiser query function to permit advertiser browsing through analytic app usage data according to advertiser supplied app-specific parameters.

19. The method of claim 17 wherein ads for mobile applications are selected on a user-location dependent manner.

20. The method of claim 17 wherein the providing further comprises:
prov255ing an advertiser query function to permit advertiser browsing through analytic app usage data according to advertiser supplied app-specific parameters.

* * * * *